United States Patent [19]

Williams et al.

[11] Patent Number: 5,709,505
[45] Date of Patent: Jan. 20, 1998

[54] VERTICAL ISOLATION SYSTEM FOR TWO-PHASE VACUUM EXTRACTION OF SOIL AND GROUNDWATER CONTAMINANTS

[75] Inventors: Richard A. Williams, Savannah; Ronald E. Hess, Webster; Michael T. Salotti, Ontario; John F. Thomasser, Bowmansville; Scott M. Huber, Canandaigua; Eliott N. Duffney, Rochester; Alfonso R. Mancini, Penfield, all of N.Y.

[73] Assignee: Xerox Corporation, Stamford, Conn.

[21] Appl. No.: 473,595

[22] Filed: Jun. 7, 1995

Related U.S. Application Data

[63] Continuation-in-part of Ser. No. 235,571, Apr. 29, 1994, abandoned.

[51] Int. Cl.⁶ .................................................. E21B 43/00
[52] U.S. Cl. ........................... 405/258; 166/268; 166/306
[58] Field of Search ................................ 166/268, 269, 166/271, 306, 135; 405/128, 258

[56] References Cited

U.S. PATENT DOCUMENTS

| | | | |
|---|---|---|---|
| Re. 33,102 | 10/1989 | Visser et al. | 166/267 |
| 2,605,637 | 8/1952 | Rhoades | 166/313 X |
| 2,925,097 | 2/1960 | Duesterberg | 166/313 X |
| 3,667,545 | 6/1972 | Knight . | |
| 3,957,116 | 5/1976 | Bouck . | |
| 3,983,939 | 10/1976 | Brown et al. | 166/269 |
| 3,990,514 | 11/1976 | Kreinin et al. | 166/271 |
| 4,265,310 | 5/1981 | Britton et al. | 166/259 |
| 4,323,122 | 4/1982 | Knopik | 166/267 |
| 4,593,760 | 6/1986 | Visser et al. | 166/267 |
| 4,640,355 | 2/1987 | Hong et al. | 166/269 |
| 4,660,639 | 4/1987 | Visser et al. | 166/267 |
| 4,699,542 | 10/1987 | Venkatesan | 166/258 |
| 4,785,882 | 11/1988 | Sprunt | 166/252 |
| 4,834,178 | 5/1989 | Knecht et al. | 166/261 |
| 5,018,576 | 5/1991 | Udell et al. | 166/272 |
| 5,050,676 | 9/1991 | Hess et al. | 166/267 |
| 5,076,360 | 12/1991 | Morrow | 166/267 |
| 5,161,613 | 11/1992 | Jones | 166/242 |
| 5,172,764 | 12/1992 | Hajali et al. | 166/267 |
| 5,190,108 | 3/1993 | Mansuy | 166/371 |
| 5,197,541 | 3/1993 | Hess et al. | 166/67 |
| 5,246,070 | 9/1993 | Greve et al. | 166/242 |
| 5,358,357 | 10/1994 | Mancini et al. | 405/128 |

FOREIGN PATENT DOCUMENTS

| | | |
|---|---|---|
| 498676 | 8/1992 | European Pat. Off. . |
| 4240969 | 6/1994 | Germany . |

OTHER PUBLICATIONS

EPA Site Demonstration of the Terra Vac In Situ Vacuum Extraction Process in Groveland, Massachusetts, Mary Stinson, 1989.

"Forced Venting to Remove Gasoline Vapor From a Large Scale Model Aquifer", American Petroleum Intstitute Pub. No. 4431, 1984.

"Venting for the Removal of Hydrocarbon Vapors from Gasoline Contaminated Soil", J. Environ. Sci. Health, A17(1), p. 31–44, 1982.

Aardvark Corporation, "Tigre Tierra Pneumatic Packers" brochure.

*Primary Examiner*—John A. Ricci
*Attorney, Agent, or Firm*—Judith L. Byorick; Michelle W. Waites

[57] ABSTRACT

Disclosed is a process for removing contaminants from a contaminated area of the subsurface which comprises providing a borehole in the contaminated area; placing in the borehole a perforated riser pipe inside of which is situated a vacuum extraction pipe with an opening situated within the perforated riser pipe, wherein a packing is situated in a portion of the annular space between the vacuum extraction pipe and the perforated riser pipe; applying a vacuum to the vacuum extraction pipe to draw gases and liquid from the subsurface into the perforated riser pipe below the packing and from the riser pipe into the vacuum extraction pipe and transport both the gases and the liquid to the surface as a common stream; forming from the common stream a stream which is primarily liquid and a stream which is primarily gaseous; and removing contaminants from at least one of the liquid stream and the gaseous stream. Also disclosed is an apparatus for carrying out the disclosed process.

23 Claims, 16 Drawing Sheets

VERTICAL ISOLATION SYSTEM FOR TWO-PHASE VACUUM EXTRACTION OF SOIL AND GROUNDWATER CONTAMINANTS

This application is a continuation-in-part of application U.S. Ser. No. 08/235,571, filed Apr. 29, 1994 entitled "High Vacuum Extraction of Soil Contaminants Along Preferential Flow Paths", now abandoned the disclosure of which is totally incorporated herein by reference.

BACKGROUND OF THE INVENTION

The present invention is directed to processes and apparatus for extracting contaminants from soil liquids and gases. More specifically, the present invention is directed to processes for extracting contaminants by high-vacuum techniques from vertically isolated areas of the subsurface with a single well. One embodiment of the present invention is directed to a process for removing contaminants from a contaminated area of the subsurface which comprises providing a borehole in the contaminated area; placing in the borehole a perforated riser pipe inside of which is situated a vacuum extraction pipe with an opening situated within the perforated riser pipe, wherein a packing is situated in a portion of the annular space between the vacuum extraction pipe and the perforated riser pipe; applying a vacuum to the vacuum extraction pipe to draw gases and liquid from the subsurface into the perforated riser pipe below the packing and from the riser pipe into the vacuum extraction pipe and transport both the gases and the liquid to the surface as a common stream; forming from the common stream a stream which is primarily liquid and a stream which is primarily gaseous; and removing contaminants from at least one of the liquid stream and the gaseous stream. Another embodiment of the present invention is directed to an apparatus for removing contaminants from a contaminated area of the subsurface which comprises a perforated riser pipe extending downwardly from the surface of the ground, a vacuum extraction pipe situated inside of the riser pipe and having an opening situated within the perforated riser pipe, a packing situated in a portion of the annular space between the vacuum extraction pipe and the perforated riser pipe, a vacuum-forming apparatus in fluid communication with the vacuum extraction pipe and adapted to form a zone of reduced pressure in the subsurface around the riser pipe below the packing, whereby gases and liquid can be drawn from the subsurface into the riser pipe below the packing and from the riser pipe into the vacuum extraction pipe and conveyed to the surface as a common stream, a vapor-liquid separator in fluid communication with the vacuum-forming apparatus and the vacuum extraction pipe, wherein the vapor-liquid separator separates the common stream into separate gas and liquid streams, and a contaminant removal system, said contaminant removal system being situated to remove contaminants from at least one of the liquid stream and the gas stream.

Contaminants can exist in subsurface soil and groundwater in the liquid or vapor phase as discrete substances and mixed with and/or dissolved in groundwater and soil gases. Various contaminants can be found in groundwater and soil, such as volatile compounds, including volatile organic compounds, nonvolatile materials, metal contaminants, and the like. Such contaminants can be found and dealt with in the vadose (unsaturated) zone found between the surface of the earth and the water table, at the interface between the vadose zone and the water table, and in the saturated zone below the water table.

At many industrial and commercial facilities and at waste handling and disposal sites, soil and groundwater are contaminated with suspended or water-soluble chemicals, or both. A variety of techniques have been used for removal of contaminants and remediation of affected soil. One common technique entails the excavation and off-site treatment of the soil. Another technique entails saturating the contaminated soil with water in situ, causing the contaminants to be leached slowly from the soil by the water. The contaminated water can then be removed.

Techniques have also been proposed for removing volatile organic contaminants from soil by vacuum extraction. For example, in U.S. Pat. No. 4,323,122, it was proposed that a vacuum be applied in a borehole at the level of the water table, the assumption being that a contaminant such as gasoline, which is lighter than water, would float on the water table and present a layer that could be drawn off by vacuum applied to the liquid at or around that level. U.S. Pat. No. 4,323, 122 (Knopik) discloses a system and method for recovering organic liquid such as gasoline which has settled on the water table in underground areas. The system comprises a conduit extending from the ground surface to a point just above the water table, a collection head fitted on the lower end of the conduit, a collection vessel connected to the upper end of the conduit, and an exhaust means for creating less than atmospheric pressure in the vessel. The collection head has a liquid impermeable end portion and a liquid permeable intermediate portion for permitting the passage of liquid. The process comprises providing an opening in the ground to a point beneath the surface of the water table, positioning the conduit with the collection head in place so that the liquid permeable wall of the collection head is just above the surface of the water table, connecting the conduit to the collection vessel intake, and exhausting air and other gaseous materials from the vessel to cause liquid to flow into the collection head through the conduit into the vessel.

Others have suggested the possibility of venting soil above the water table (i.e., in the vadose zone) to cause vaporization of the contaminant in the soil, and then drawing off the contaminant in the vapor phase. Groundwater requiring treatment is in such processes conventionally removed by pumping from separate conventional water wells. In situations in which water does flow into vacuum extraction wells, it has been suggested that a second, liquid phase pump be placed either in the well or at the surface to remove the water through a second conduit. For example, U.S. Pat. No. 4,660,639 (Visser et al.), the disclosure of which is totally incorporated herein by reference, discloses a process for the removal of volatile contaminants from the vadose zone of contaminated ground by extracting volatilized contaminants from the vadose zone by way of one or more vacuum extraction wells. The process entails drilling one or more wells into the subsurface media in the contaminated area, the well being constructed so that fluids in the vadose zone can flow into the well, whereas the liquid in the saturated zone below the water table cannot substantially flow into the well. The borehole and conduit of the well can optionally extend below the water table, in which case the vacuum applied to the upper portion of the conduit will be effective to draw contaminant from the vadose zone, but insufficient to draw a significant amount of water from the saturated zone into the conduit. If it is desired to remove groundwater from below the water table, this removal is accomplished either by a separate sampling device situated in the borehole or through a separate well.

In addition, Stinson, "EPA Site Demonstration of the Terra Vac In Situ Vacuum Extraction Process in Groveland, Mass.", Air & Waste Management Association, Vol. 39, No. 8, pages 1054 to 1062 (1989), the disclosure of which is totally incorporated herein by reference, discloses an evaluation of an in situ vacuum extraction process. The process entails removal of contaminants from the vadose zone by vacuum. Wells are installed in the contaminated vadose soil. A vacuum pump or blower induces air flow through the soil, stripping and volatilizing volatile organic compounds from the soil matrix into the air stream. Liquid water, if present in the soil, is also extracted along with the contamination. The stream of contaminated air and water flows to a vapor/liquid separator where contaminated water is removed. The contaminated air stream then flows through a treatment system such as gas-phase activated carbon to remove contaminants from the air stream. The clean air is exhausted to the atmosphere through a vent. U.S. Pat. No. 4,593,760 (Visser et al.), the disclosure of which is totally incorporated herein by reference, and U.S. Reissue Pat. Re. 33,102, the disclosure of which is totally incorporated herein by reference, also disclose processes for removal of volatile contaminants from the vadose zone of contaminated ground by pumping volatilized contaminants from the vadose zone using one or more vacuum extraction wells.

"Forced Venting to Remove Gasoline Vapor from a Large-Scale Model Aquifer," American Petroleum Institute, Health and Environmental Sciences Department, API Publication No. 4431 (1984) discloses the results of experiments examining forced venting of air through the soil above a gasoline spill in a model aquifer. Various flow rates and geometries for the venting plumbing were used to determine the most efficient method of removing gasoline from the underground environment and lowering gasoline vapor concentrations in the unsaturated zone above the spill.

"Venting for the Removal of Hydrocarbon Vapors from Gasoline Contaminated Soil," J. Thornton and W. Wootan, *J. Environ. Sci. Health*, A17(1), 31–44 (1982) discloses the results of an experiment investigating the use of a venting strategy to remove gasoline vapors from contaminated soil strata. A contained gasoline leak was created in a large outdoor facility which simulates soil strata and a static water table. An air flow was established, and vapor samples taken before, during, and after venting were checked for hydrocarbon content.

U.S. Pat. No. 2,605,637 (Rhoades), the disclosure of which is totally incorporated herein by reference, discloses a method of subterranean surveying to determine the liquid levels of a plurality of superimposed fluid bearing strata through a single drill hole. A plurality of tubes are housed within a single drill hole. The tubes are positioned at varying subterranean fluid bearing strata and are used to measure liquid levels in each of the isolated strata.

U.S. Pat. No. 2,925,097 (Duesterberg), the disclosure of which is totally incorporated herein by reference, discloses a tubular member adapted to be positioned in the flow string of an oil or gas well. A plurality of flow tubes are placed within a wellbore for removing well fluids. The tubes comprise a perforate section that prevents cutting out or eroding caused by high fluid pressure or abrasive fluids.

U.S. Pat. No. 4,834,178 (Knecht et al.), the disclosure of which is totally incorporated herein by reference, discloses a process and apparatus for fireflooding with liquid heat transfer media comprising injection of oxidant gas and liquid heat transfer media into a well through separate conduits, the liquid conduit downstream end submerged in a liquid volume, so as to form a seal and prevent oxidant gas migration into the liquid conduit.

U.S. Pat. No. 5,161,613 (Jones), the disclosure of which is totally incorporated herein by reference, discloses a method and apparatus for treating multiple strata in a single operation from a single wellbore which penetrates a treatment interval which, in turn, includes a plurality of strata which, in turn, have different permeabilities. A treating fluid, such as a consolidating agent, acid, or the like, is delivered directly to different levels within a section of the wellbore adjacent the interval to be treated through a plurality of alternate paths which, in turn, lie substantially adjacent to the strata to be treated.

U.S. Pat. No. 5,190,108 (Mansuy), the disclosure of which is totally incorporated herein by reference, discloses the inhibition of biological fouling of water wells by replacing the air in the well column with an anoxic gas such as nitrogen to deprive aerobic bacteria of oxygen. The anoxic gas is applied from a cylindrical tank at the surface and through a gas pipe extending from the tank down into the well casing. The well casing is sealed near the top to prevent air infiltration and maintain a positive gas pressure. The anoxic gas is applied at a slightly positive pressure to maintain the well column filled with it and to prevent air penetration. The gas can be supplied to the well column only or to both the well column and the aquifer so that a blanket of gas in the area of the well inhibits air penetration of the water from the unsaturated cover layer above the aquifer.

U.S. Pat. No. 5,246,070 (Greve et al.), the disclosure of which is totally incorporated herein by reference, discloses a method for completing a groundwater monitoring site including several monitoring points disposed at different depths. The piping includes a single multi-conduit pipe having a smooth, tightly packable outer wall and being composed of individual pipe lengths which are coupled to each other in a sealed relationship. The pipe lengths are subdivided in the longitudinal direction into several conduits by partition walls and are coupled to each other in such a fashion that their conduits are in relative alignment at the junctures and not reduced in area. For the purpose of providing filter sections for the admission of water, individual pipe lengths are provided in their outer wall with filter slots in the area of one or several conduits.

U.S. Pat. No. 3,983,939 (Brown et al.) discloses a method for recovering viscous petroleum from thick formations by forming or ensuring that there are naturally occurring high permeability strata in the upper portion and in the lower portion of the petroleum formation and establishing separate communication means between the surface of the earth and the upper and lower high permeability strata to achieve effective downward displacement. A heated fluid such as steam is injected into one well in fluid communication with the lower high permeability strata to pass horizontally through the high permeability strata to another well which is also in fluid communication with the lower high permeability strata, sufficient to heat the lower high permeability zone to a temperature substantially above the ambient temperature of the formation. A solvent having a boiling point intermediate between the ambient temperature of the formation and the temperature to which the communication path is heated is injected into the heated communication path. The solvent vaporizes and moves up into the formation immediately thereabove to dissolve into the viscous petroleum. A gaseous substance is then injected into the upper high permeability strata to increase the pressure therein sufficiently to displace the mixture of viscous petroleum and solvent downward into the lower high permeability strata, wherein it is displaced horizontally to a remotely located well for recovery to the surface of the earth.

U.S. Pat. No. 4,265,310 (Britton et al.) discloses a fracture preheat oil recovery process wherein a zone of increased heat and enhanced fluid mobility is established between an injection well and a production well vertically traversing a heavy oil reservoir by first horizontally hydraulically fracturing between the wells and then injecting hot water and/or steam into the injection well at a very high rate, at a sufficient pressure, and for a sufficient time to float the formation along the fracture system between the wells to effect channel flow of fluids through the floated fracture system and to effect effective and uniform heating of substantial reservoir volume perpendicular to the channel flow. Thereupon, other thermal methods such as matrix flow steam flooding can be employed to recover additional oil.

U.S. Pat. No. 5,018,576 (Udell et al.) discloses a method for in situ decontamination of contaminated subsurface area by injection of steam into injection wells and withdrawing liquids and vapors from extraction wells under subatmospheric pressure whereby steam is passed through the contaminated area in an essentially horizontal direction. After a substantial portion of the contamination has been removed in this manner, the injection of steam is ceased but the extraction at subatmospheric pressure is continued to volatilize and remove the residual water and contaminants trapped in the pores of the soil. The steam injection may be periodically resumed to reheat the area and to replenish the water in the pores.

U.S. Pat. No. 4,785,882 (Sprunt) discloses enhanced hydrocarbon recovery from a subterranean reservoir by maintaining the effective reservoir pressure below the reservoir crushing pressure during a first production period, causing the effective reservoir pressure to exceed the reservoir crushing pressure after the first production period so as to crush the reservoir and reduce the reservoir permeability, and then producing hydrocarbons from the reservoir during a second production period in which hydrocarbon production is enhanced due to better sweep efficiency as a result of the lowered permeability of the reservoir.

U.S. Pat. No. 4,669,542 (Venkatesan) discloses a method for simultaneous recovery of crude oil from multiple zones in a reservoir wherein multiple wells, each in fluid communication with at least two hydrocarbon zones separated by an impermeable barrier, are used to produce oil in an enhanced recovery process. The end product from recovery in one zone is used to augment the recovery process in another zone.

U.S. Pat. No. 4,640,355 (Hong et al.) discloses a method and apparatus for injecting compressible fluids into multiple zones of a hydrocarbon bearing formation, in particular injecting compressible fluid at a predetermined constant rate into multiple zones through a single tubing string. Producing zones are packed off and limited entry outlets are installed on the injection tubing string at each producing zone. Injection pressure is maintained and limited entry outlets are designed and sized such that the compressible fluid reaches sonic flow through the outlets so that the flow rate no longer responds to changes in downstream pressures.

U.S. Pat. No. 3,990,514 (Kreinin et al.) discloses a method of connecting wells by hydraulic fracturing of a mineral bed primarily for connection of wells in underground gasification of coal beds. Hydraulic fracturing of a bed is effected intermediate a source well into which a liquid is pumped under pressure and a well in the required direction. The head of the well with which connection is to be effected is sealed, whereas the heads of the wells with which connection is undesirable are opened. The liquid is pumped into the source well under a pressure sufficient for initiating hydraulic fracturing. The pressure in the well with which the source well is to be connected is measured and the moment the pressure in this well attains the hydraulic fracturing value, the head thereof is immediately opened. Upon the formation of a hydraulic fracturing fissure, the latter is flushed with the liquid. The method provides for building up a hydraulic fracturing pressure in the well with which connection of the source well is to be effected and thus controlling the direction of the formation of a hydraulic fracturing fissure.

U.S. Pat. No. 3,957,116 (Bouck) discloses an improvement in displacement processes for recovery of liquid hydrocarbons from a hydrocarbon bearing formation having zones of different permeability wherein the displacement processes comprise injecting a drive fluid through an injection well vertically traversing the formation and recovering by means of a production well the liquid hydrocarbons which are displaced by the injection of the drive fluid. A water insoluble liquid is injected into the permeable zone to increase drive efficiency in the less permeable zone.

U.S. Pat. No. 3,667,545 (Knight) discloses the injection of an aqueous solution containing a mobility reducing agent into a portion of a highly permeable zone adjacent to a lesser permeable zone to influence zone boundary plugging in a highly stratified reservoir and thereby increase the efficiency of a subsequent micellar flooding process in the highly and/or lesser permeable zone(s). The process reduces or eliminates micellar slug loss to the tighter zones, thus effecting a more economical flood.

U.S. Pat. No. 5,050,676 (Hess et al.) and U.S. Pat. No. 5,197,541 (Hess et al.), the disclosures of each of which are totally incorporated herein by reference, disclose apparatus and processes for two phase vacuum extraction of contaminants from the ground which entails vacuum withdrawal of liquid and gaseous phases as a common stream, separation of the liquid and gaseous phases, and subsequent treatment of the separated liquid and gases to produce clean effluents. Two phase vacuum extraction employs a single vacuum generating device to remove contaminants in both the liquid stream and soil gases through a single well casing.

U.S. Pat. No. 5,172,764 (Hajali et al.), the disclosure of which is totally incorporated herein by reference, discloses an apparatus and process for removing contaminants from a contaminated area of the ground having a vadose zone and a water table which comprises providing a borehole in the contaminated area; placing in the borehole a perforated riser pipe inside of which is situated a vacuum extraction pipe with an opening situated near, at, or at any point below the water table within the perforated riser pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a common stream; forming from the common stream a stream which is primarily liquid and a stream which is primarily gaseous; and separately treating the separated liquid and gas streams.

U.S. Pat. No. 5,076,360 (Morrow), the disclosure of which is totally incorporated herein by reference, discloses methods and apparatus for vacuum extraction of contaminants from the ground which, in a preferred embodiment, entails vacuum withdrawal of liquid and gaseous phases as a common stream, separation of the liquid and gaseous phases, and subsequent treatment of the separated liquid and gases to produce clean effluent. A primed vacuum extraction employs a single vacuum generating device to remove contaminants in both the liquid stream and soil gases through a single well casing utilizing a priming tube which introduces air or other gas to the liquid collected at the bottom of a well. The method permits vacuum extraction of both liquids and gases from the subsurface by way of wells having a liquid layer which is more than thirty feet below the soil surface or in which a screened interval of the extraction pipe is entirely below the liquid surface.

U.S. Pat. No. 5,358,357 (Mancini et al.), the disclosure of which is totally incorporated herein by reference, discloses a process and apparatus in which vacuum extraction is used to remove soil contaminants in both the saturated and vadose zones. One embodiment of the invention is directed to a process for removing contaminants from a contaminated area of the ground having a vadose zone and a water table, which comprises providing a borehole in the contaminated area to a depth below the water table; placing in the borehole to a depth below the water table a perforated riser pipe inside of which is situated a vacuum extraction pipe with a bottom opening situated within the perforated riser pipe, said vacuum extraction pipe containing groundwater prior to application of a vacuum thereto, said vacuum extraction pipe having at least one gas inlet situated below the groundwater level in the vacuum extraction pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a two-phase common stream; introducing a gas into the vacuum extraction pipe at a level below the groundwater level in the vacuum extraction pipe to initiate two-phase flow within the vacuum extraction pipe; forming from the common stream a stream which is primarily liquid and a stream which is primarily gaseous; and separately treating the separated liquid and gas streams.

Copending application U.S. Ser. No. 08/236,791, filed Apr. 29, 1994, with the named inventors Eliott N. Duffney, Paul M. Tornatore, Scott M. Huber, and Ronald E. Hess, entitled "Apparatus and Process for Treating Contaminated Soil Gases and Liquids," the disclosure of which is totally incorporated herein by reference, discloses an apparatus for extracting contaminants from a stream comprising a contaminant-containing mixture of liquids and gases which comprises: (a) a contaminant-containing mixture input; (b) a vapor-liquid separator receiving the contaminant-containing mixture from the input and producing a liquid component stream at a first outlet and a gaseous component at a second outlet; (c) an optional first contaminant removal system receiving the liquid component stream from the vapor-liquid separator and producing a contaminant-free liquid stream; (d) a vacuum inducing device in fluid communication with the contaminant-containing mixture input and the vapor-liquid separator and receiving said gaseous component from the vapor-liquid separator; (e) a cooling element receiving the gaseous component at a first temperature from the vacuum inducing device and producing the gaseous component at a second temperature from a first outlet and a condensed liquid component from a second outlet, said second temperature being lower than said first temperature; (f) a heating element receiving the gaseous component from the cooling element at said second temperature and producing a reduced-relative-humidity gas component at a third temperature, said third temperature being higher than said second temperature, said heating element having a heating jacket surrounding a conduit through which the gaseous component passes through the heating element, said heating jacket receiving a heating fluid from a first heat fluid conduit into a heating jacket input and outputting said heating fluid from a heating jacket outlet into a second heating fluid conduit; and (g) an optional second contaminant removal system receiving the reduced-relative-humidity gas component from the heating element and producing a contaminant-free gas; wherein the apparatus necessarily includes either the first contaminant removal system or the second contaminant removal system.

Copending application U.S. Ser. No. 08/235,571, filed Apr. 29, 1994, with the named inventors Eliott N. Duffney, Paul M. Tornatore, Scott M. Huber, and Ronald E. Hess, entitled "High Vacuum Extraction of Soil Contaminants Along Preferential Flow Paths," the disclosure of which is totally incorporated herein by reference, discloses a process for removing contaminants from a contaminated area of the ground comprising soil having a first permeability, said ground having a plurality of paths of preferential flow, each path having a permeability at least ten times greater than the first permeability, which process comprises providing a borehole in the contaminated area to intersect at least a first path of preferential flow and a second path of preferential flow, said second path of preferential flow being situated at a depth greater than said first path of preferential flow; placing in the borehole a first vacuum extraction pipe having a bottom opening situated within the first path of preferential flow and a second vacuum extraction pipe having a bottom opening situated within the second path of preferential flow; isolating the first path of preferential flow from the second path of preferential flow so that a vacuum applied to the first vacuum extraction pipe with a bottom opening situated in the first path of preferential flow will extract gases and liquids from the first path of preferential flow but not from the second path of preferential flow and a vacuum applied to the second vacuum extraction pipe with a bottom opening situated in the second path of preferential flow will extract gases and liquids from the second path of preferential flow but not from the first path of preferential flow; applying a vacuum to at least one of the vacuum extraction pipes to draw gases and liquid from at least one of the paths of preferential flow into a vacuum extraction pipe and transport both the gases and the liquid to the surface as a common stream; forming from the common stream a stream which is primarily liquid and a stream which is primarily gaseous; and removing contaminants from at least one of the liquid stream and the gaseous stream. Also disclosed is an apparatus for carrying out this process.

Copending application U.S. Ser. No. 08/477,014, entitled "Variable Position Remotely Actuable Packer Device", with the named inventors Michael T. Salotti, Ronald E. Hess, and Richard A. Williams, filed Jun. 7, 1995, the disclosure of which is totally incorporated herein by reference, discloses a remotely actuable, vertically adjustable packer for wells and boreholes. The packer uses multiple sealing members, one to form a seal between the packer and the well casing wall, and a second, to form a seal between the packer and a riser tube used to remove fluid material from the well. The sealing members are flexible and also allow other conduits to pass between the sealing members and then form a seal around these conduits when actuated. This allows compressed air or other materials to be injected into the well below the seal. The described packer allows any vertical portion of a well to be segregated from another well portion. If plural packers are used then multiple vertical sections of the well can be sealed from one another. In one embodiment, the invention is directed to an apparatus for segregating a portion of a bore hole, comprising a frame, a positioning device attached to said frame for locating the frame within the borehole, a first sealing member attached to said frame, a second sealing member attached to said frame, and a remote actuating device for actuating said first sealing member and said second sealing member at a desired position.

Although known apparatus and processes are suitable for their intended purposes, a need remains for processes and apparatus for removing contaminants from bedrock, groundwater, and soil which enables contaminant removal from soils of varying air permeability and varying porosity. Further there is a need for processes and apparatus for removing contaminants from bedrock, groundwater, and soil which enables increased flexibility in the location of extraction wells. There is also a need for processes and apparatus for removing contaminants from bedrock, groundwater, and soil that can be implemented by modifying existing vacuum extraction systems.

Further, in some instances it may be desirable to remove contaminants from groundwater and soil gases from ground comprising relatively impermeable soils, such as silt, clay, mixtures of sand, silt, and clay, massive clay, or the like, or from ground comprising relatively impermeable rock, such as laminated sandstone, shale, mudstone, massive igneous and metamorphic rock, or the like.

Additionally, it may be desirable to remove contaminants selectively from one or more paths of preferential flow within an area of the subsurface, where areas of relatively low permeability are surrounded by areas of relatively high permeability. It may also be desirable, in this instance, to be able to extract contaminants selectively from one or more paths of preferential flow through a single borehole or well. Extracting contaminants through a single borehole from multiple paths of preferential flow enables reduced installation costs, reduced and simpler apparatus, and less disruption to business in the contaminated area. Further, it may be desirable to apply vacuum extraction to one or more preferential flow paths while at the same time introducing a fluid (including gases and/or liquids) into one or more adjacent flow paths. In addition, it may be desirable to apply vacuum extraction to a plurality of preferential flow paths either simultaneously or in a desired sequence.

Further, it may be desirable to reduce or eliminate preferential flow through higher permeability zones and allow for depth manipulation of vacuum delivery to the strata surrounding an extraction well. Preferential flow paths of soil gas to the extraction well volatilize and remove contaminants from those preferential flow zones only, while the adjacent lower permeability areas may realize little or no soil gas and/or groundwater movement. Higher permeability materials such as those used to bed subgrade utility conveyance lines and construction fill materials may also "short-circuit" the flow of soil gas through the contaminated zone where vacuum delivery and soil gas and/or groundwater extraction is desired. It may be desired to allow for the delivery of vacuum to lower permeability zones and not to surrounding higher permeability zones. It may also be desired to prevent the establishment of preferential flow paths in the soil surrounding an extraction well. It may further be desired to allow for the removal of soil gases and liquids through selected areas throughout the vertical extent of an extraction well and its radius of influence, resulting in the removal of contamination from areas that would otherwise be compromised by preferential flow. In addition, it may be desired to reduce or eliminate "venting" in an extraction borehole, wherein atmospheric air is drawn through high permeability topsoil directly into the borehole near the surface and from the borehole down into a perforated riser pipe therein, rather than being drawn through the soil to the level of the perforations within the riser pipe and then into the borehole at that level. Further, it may be desired to increase the number of extraction wells which can be in fluid communication with a single vacuum system; since vacuum systems are frequently limited by the number of cubic feet per minute of gas which can be passed therethrough, by reducing the number of cubic feet per minute drawn from each well, more wells can be used with a single vacuum system. Additionally, it may be desired to increase the vacuum delivered to the extraction wells, thereby increasing mass removal and increasing the pressure gradient, resulting in a wider zone of vacuum influence. There may also be a need or desire to exert positive pressure on a first well and extract contaminants from a second well, with the ability to control precisely the area and depth where gas enters and exits the zone between the first and second wells. In addition, it may be desired to extract liquids and gases through one or more selected layers of soil or rock which have a relatively greater bonding potential with the contaminants therein to maximize the flow of liquids and gases through those layers.

SUMMARY OF THE INVENTION

It is an object of the present invention to provide a process and apparatus for removing contaminants from bedrock, groundwater, and soil with the above noted advantages.

It is another object of the present invention to provide a process and apparatus for removing contaminants from bedrock, groundwater, and soil which enables contaminant removal from soils of varying air permeability and varying porosity.

It is yet another object of the present invention to provide a process and apparatus for removing contaminants from bedrock, groundwater, and soil which enables increased flexibility in the location of extraction wells.

It is still another object of the present invention to provide a process and apparatus for removing contaminants from bedrock, groundwater, and soil that can be implemented by modifying existing vacuum extraction systems.

Another object of the present invention is to provide a process and apparatus for removing contaminants from bedrock, groundwater, and soil which enables contaminant removal from ground comprising relatively impermeable soils or relatively impermeable rock.

Yet another object of the present invention is to provide a process and apparatus for removing contaminants from bedrock, groundwater, and soil which enables contaminant removal from ground having a permeability of no more than about $10^{-8}$ centimeters per second.

Still another object of the present invention is to provide a process and apparatus for removing contaminants from bedrock, groundwater, and soil which enables selective contaminant removal from one or more paths of preferential flow within an area of the ground through a single borehole.

It is another object of the present invention to provide a process and apparatus for removing contaminants from bedrock, groundwater, and soil which enables application of vacuum extraction to one or more preferential flow paths while at the same time introducing a fluid into one or more adjacent flow paths.

It is yet another object of the present invention to provide a process and apparatus for removing contaminants from bedrock, groundwater, and soil which enables application of vacuum extraction to a plurality of preferential flow paths either simultaneously or in a desired sequence.

It is still another object of the present invention to provide a process and apparatus for removing contaminants from bedrock, groundwater, and soil which reduces or eliminates preferential flow through higher permeability zones and allows for depth manipulation of vacuum delivery to the strata surrounding an extraction well.

Another object of the present invention is to provide a process and apparatus for removing contaminants from bedrock, groundwater, and soil which allows for the delivery of vacuum to lower permeability zones and not to surrounding higher permeability zones.

Yet another object of the present invention is to provide a process and apparatus for removing contaminants from bedrock, groundwater, and soil which prevents the establishment of preferential flow paths in the soil surrounding an extraction well.

Yet another object of the present invention is to provide a process and apparatus for removing contaminants from bedrock, groundwater, and soil which establishes preferential flow paths in the soil surrounding an extraction well.

Still another object of the present invention is to provide a process and apparatus for removing contaminants from bedrock, groundwater, and soil which allows for the removal of soil gases and liquids through selected areas throughout the vertical extent of an extraction well and its radius of influence, resulting in the removal of contamination from areas that would otherwise be compromised by preferential flow.

It is another object of the present invention to provide a process and apparatus for removing contaminants from bedrock, groundwater, and soil which reduces or eliminates "venting" in an extraction borehole.

It is yet another object of the present invention to provide a process and apparatus for removing contaminants from bedrock, groundwater, and soil which increases the number of extraction wells which can be in fluid communication with a single vacuum system.

It is still another object of the present invention to provide a process and apparatus for removing contaminants from bedrock, groundwater, and soil which increases the vacuum delivered to the extraction wells, thereby increasing mass removal and increasing the pressure gradient, resulting in a wider zone of vacuum influence.

Another object of the present invention is to provide a process and apparatus for removing contaminants from bedrock, groundwater, and soil which enables exertion of positive pressure on a first well and extraction of contaminants from a second well, with the ability to control precisely the area and depth where gas enters and exits the zone between the first and second wells.

Yet another object of the present invention is to provide a process and apparatus for removing contaminants from bedrock, groundwater, and soil which enables extraction of liquids and gases through one or more selected layers of soil or rock which have a relatively greater bonding potential with the contaminants therein to maximize the flow of liquids and gases through those layers.

These and other objects of the present invention (or specific embodiments thereof) can be achieved by providing a process for removing contaminants from a contaminated area of the subsurface which comprises providing a borehole in the contaminated area; placing in the borehole a perforated riser pipe inside of which is situated a vacuum extraction pipe with an opening situated within the perforated riser pipe, wherein a packing is situated in a portion of the annular space between the vacuum extraction pipe and the perforated riser pipe; applying a vacuum to the vacuum extraction pipe to draw gases and liquid from the subsurface into the perforated riser pipe below the packing and from the riser pipe into the vacuum extraction pipe and transport both the gases and the liquid to the surface as a common stream; forming from the common stream a stream which is primarily liquid and a stream which is primarily gaseous; and removing contaminants from at least one of the liquid stream and the gaseous stream. Another embodiment of the present invention is directed to an apparatus for removing contaminants from a contaminated area of the subsurface which comprises a perforated riser pipe extending downwardly from the surface of the ground, a vacuum extraction pipe situated inside of the riser pipe and having an opening situated within the perforated riser pipe, a packing situated in a portion of the annular space between the vacuum extraction pipe and the perforated riser pipe, a vacuum-forming apparatus in fluid communication with the vacuum extraction pipe and adapted to form a zone of reduced pressure in the subsurface around the riser pipe below the packing, whereby gases and liquid can be drawn from the ground into the riser pipe below the packing and from the riser pipe into the vacuum extraction pipe and conveyed to the surface as a common stream, a vapor-liquid separator in fluid communication with the vacuum-forming apparatus and the vacuum extraction pipe, wherein the vapor-liquid separator separates the common stream into separate gas and liquid streams, and a contaminant removal system, said contaminant removal system being situated to remove contaminants from at least one of the liquid stream and the gas stream.

BRIEF DESCRIPTION OF THE DRAWINGS

Illustrated schematically in FIG. 1 is a side elevation view in cross section illustrating a general arrangement for vacuum extraction of contaminants from a contaminated area of the subsurface in accordance with the present invention when no preferential flow paths in the surrounding soil as yet exist.

Illustrated schematically

Figure 3:
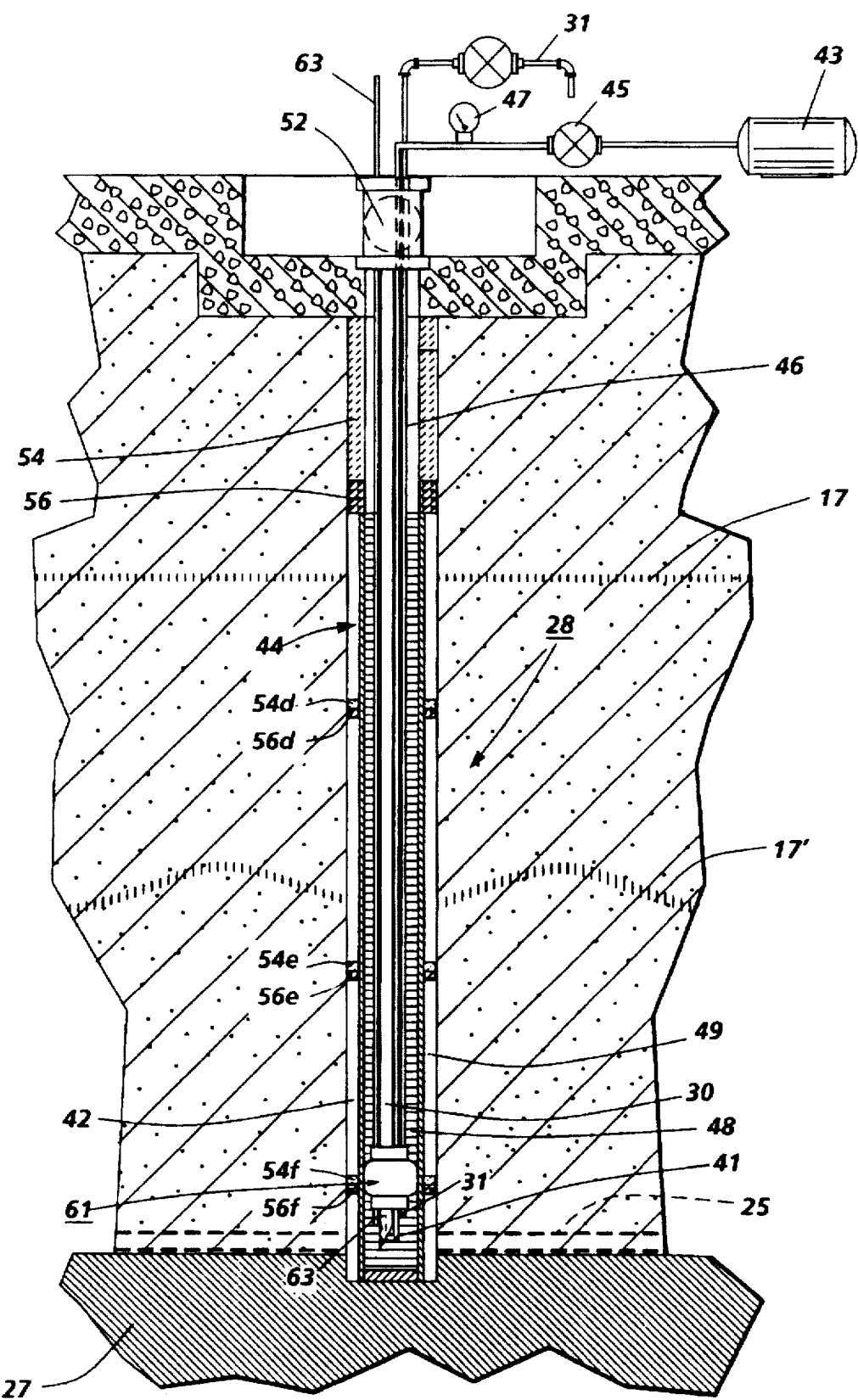

Illustrated schematically in FIG. 3 is a cross-sectional view in side elevation of an extraction well suitable for the present invention when no preferential flow paths in the surrounding soil as yet exist.

Figure 4:
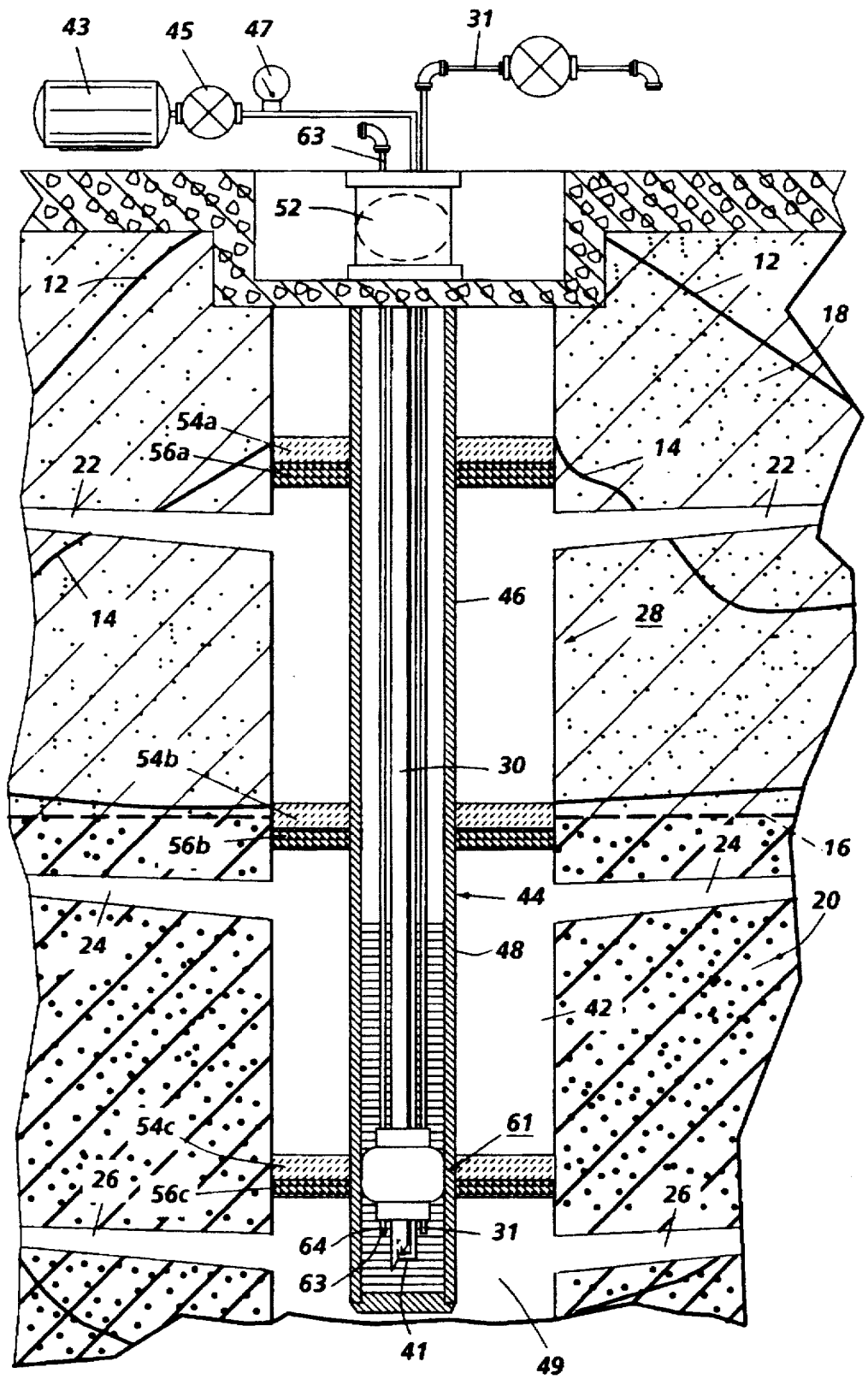

Illustrated schematically in FIG. 4 is a cross-sectional view in side elevation of an extraction well suitable for the present invention when preferential flow paths in the surrounding soil have been established.

Figure 5:
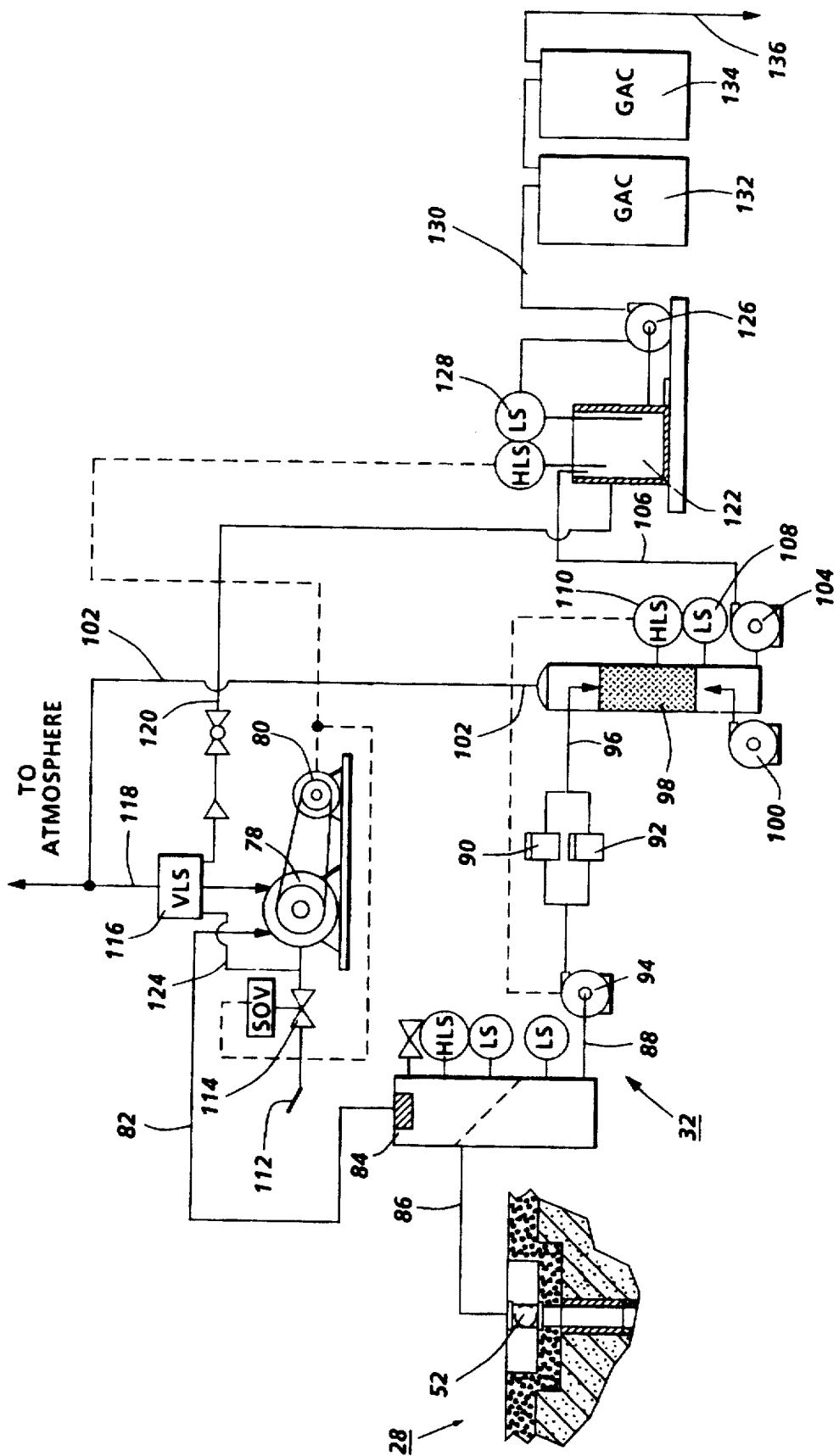

Illustrated schematically FIG. 5 is a schematic view of an example of an apparatus for handling and treating materials removed from the ground by the vacuum extraction apparatus and process of the present invention.

Illustrated schematically 6 is a schematic view of another example of an apparatus for handling and treating materials removed from the ground by the vacuum extraction apparatus and process of the present invention.

Figure 7:
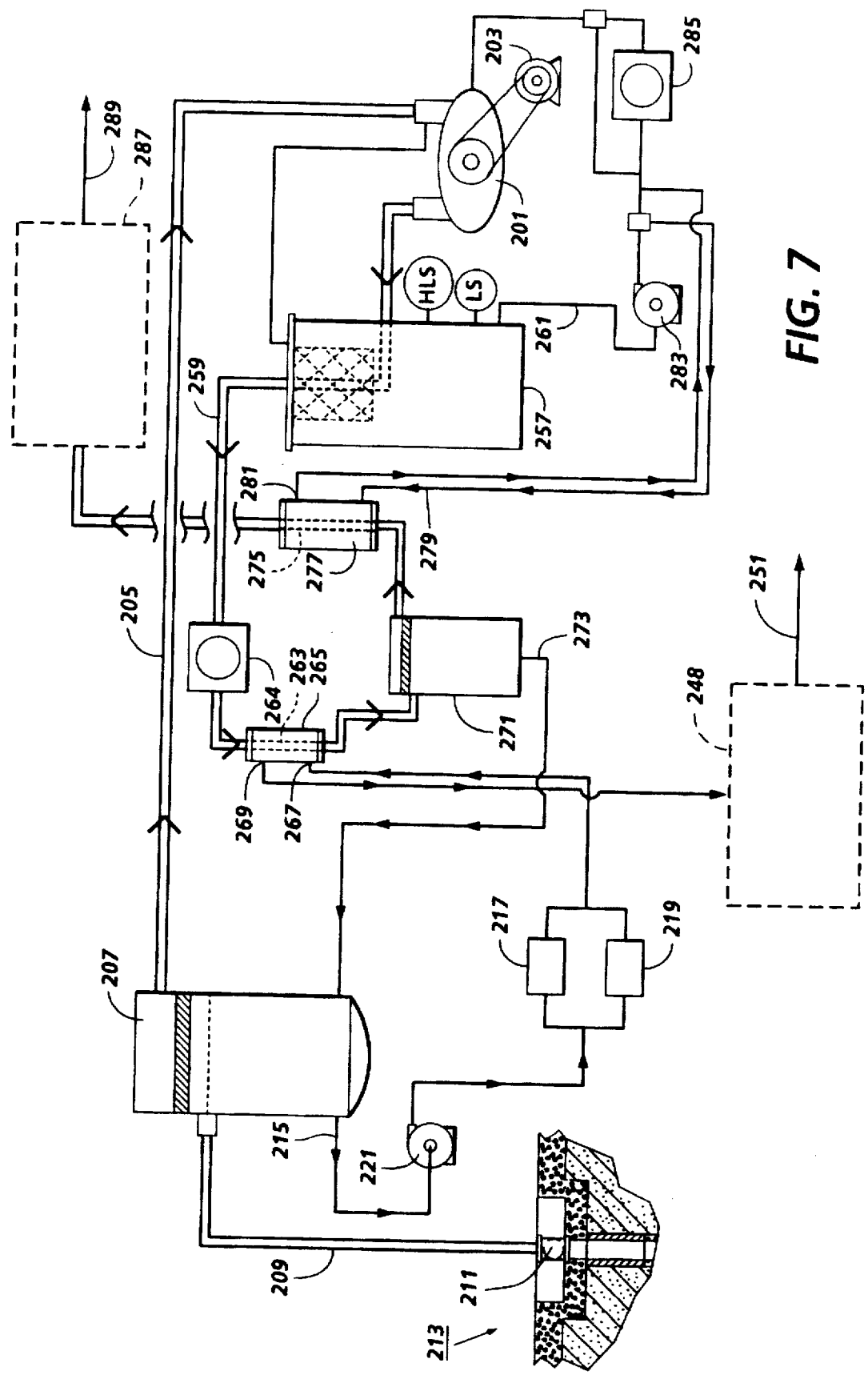

Illustrated schematically in FIG. 7 is a schematic view of yet another example of an apparatus for handling and treating materials removed from the ground by the vacuum extraction apparatus and process of the present invention.

Figure 8:
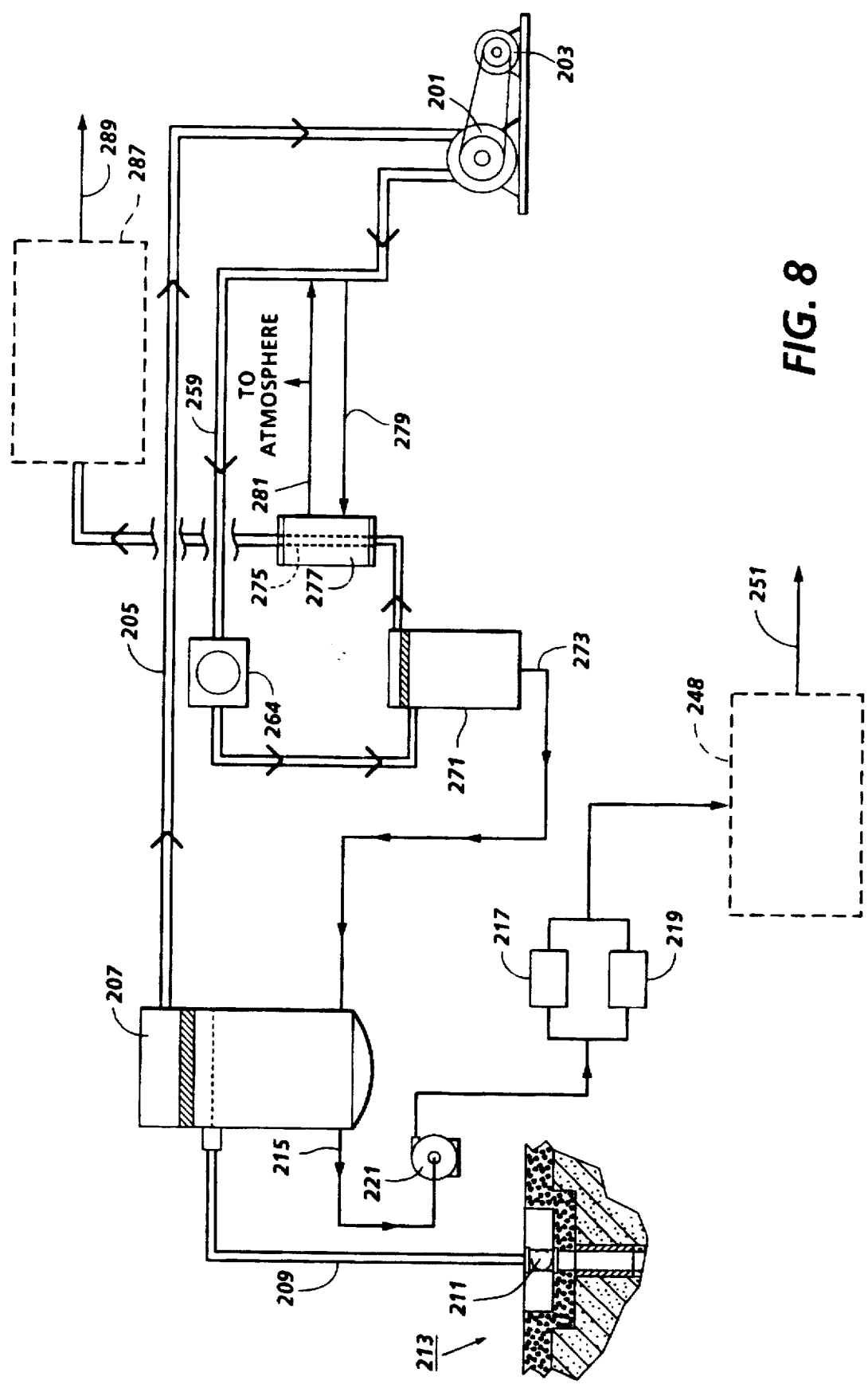

Illustrated schematically in FIG. 8 is a schematic view of still another example of an apparatus for handling and treating materials removed from the ground by the vacuum extraction apparatus and process of the present invention.

Figure 9:
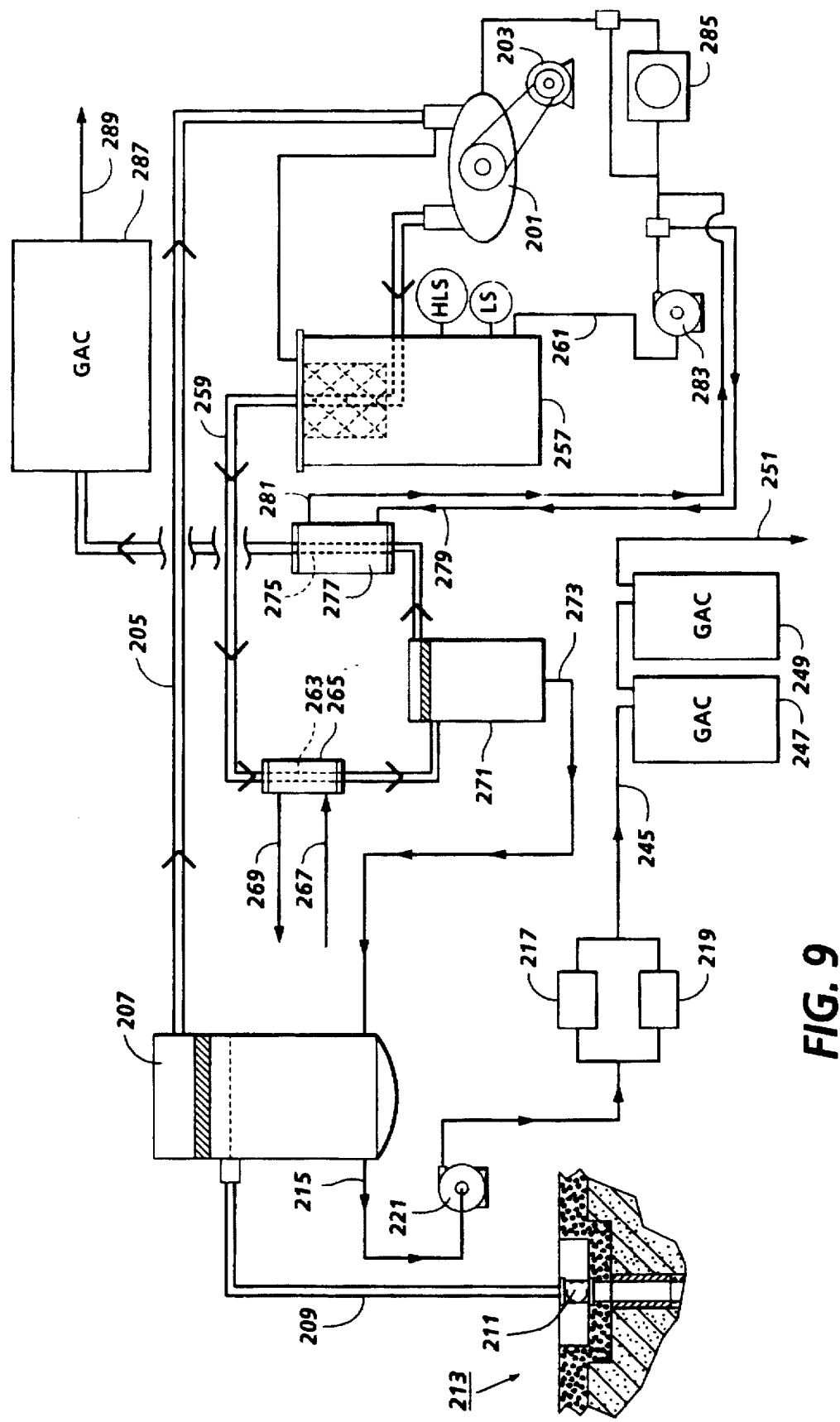

Illustrated schematically in FIG. 9 is a further example of an apparatus for handling and treating materials removed from the ground by the vacuum extraction apparatus and process of the present invention.

Figure 10:
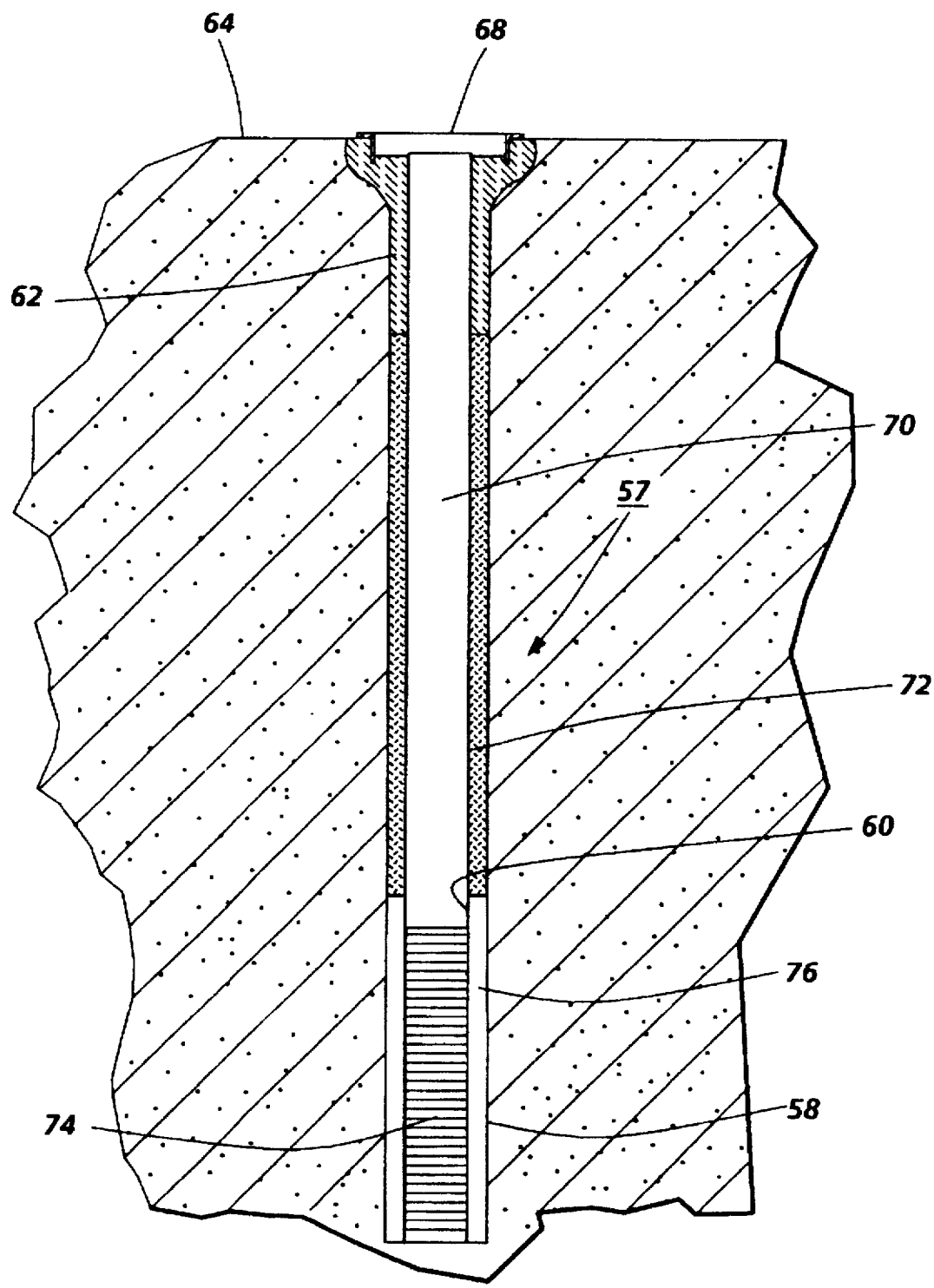
Figure 11:
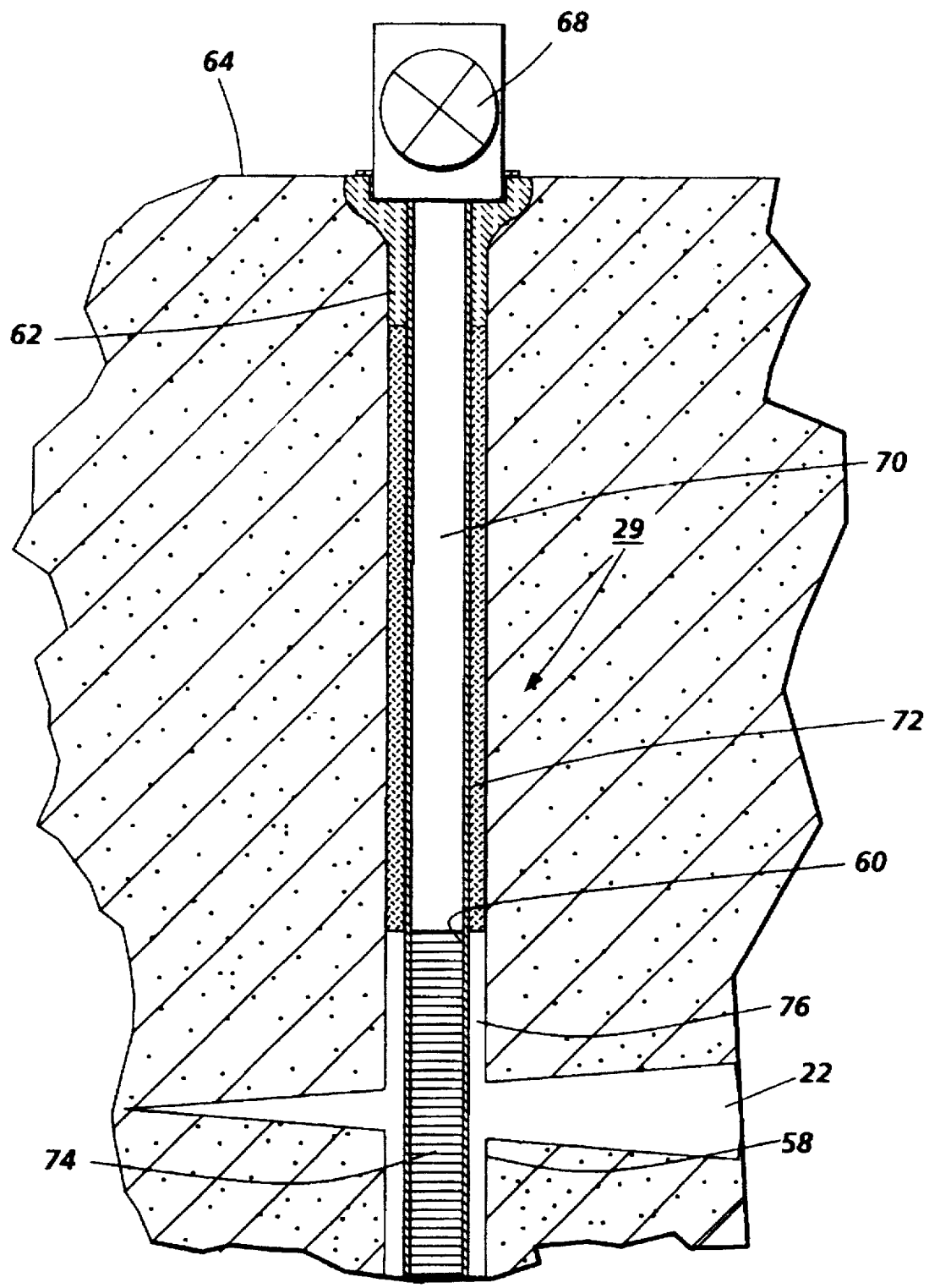

Illustrated schematically in FIGS. 10 and 11 are cross-sectional views in side elevation of air inlet wells suitable for use with the present invention.

Figure 12:
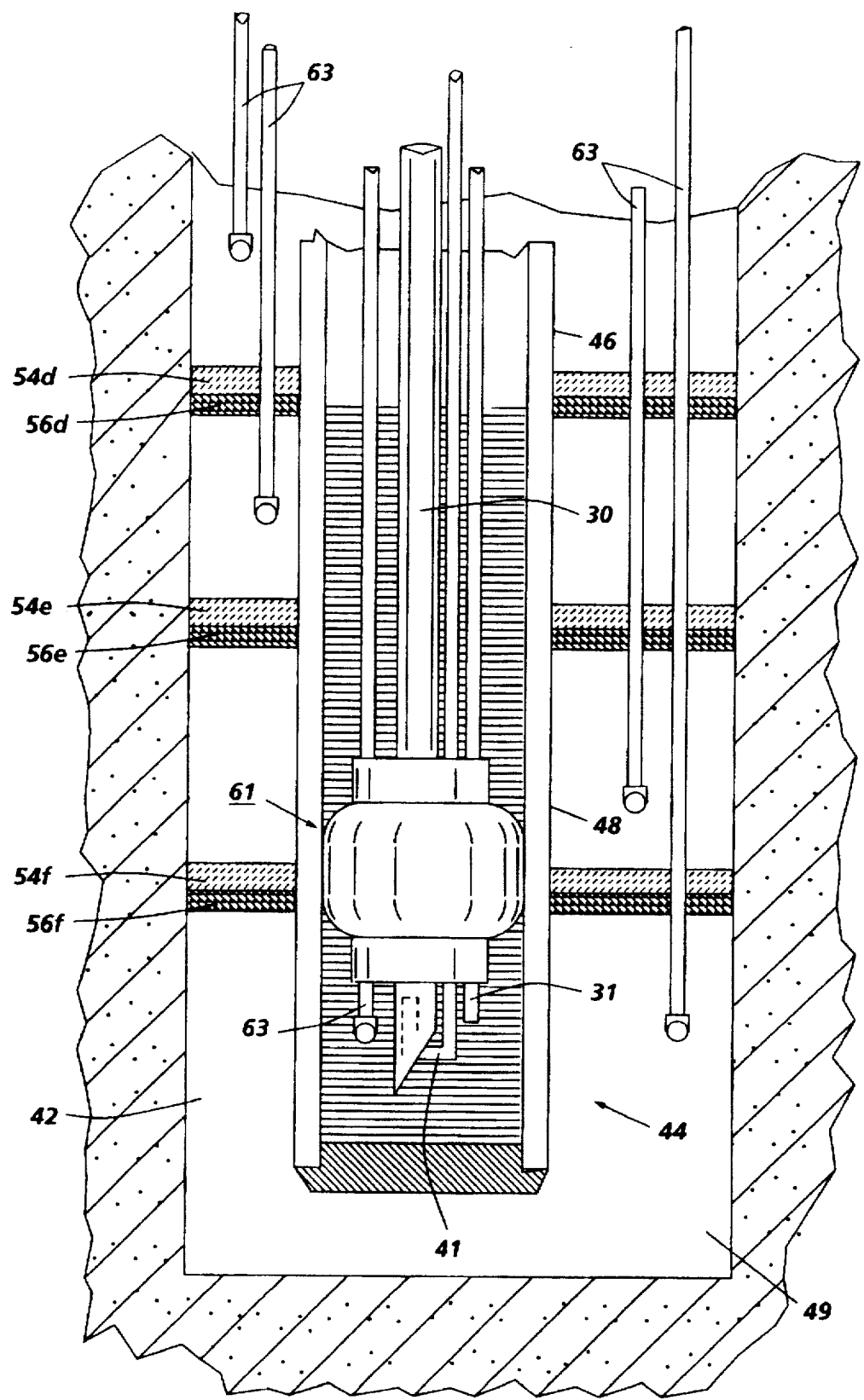
Figure 13:
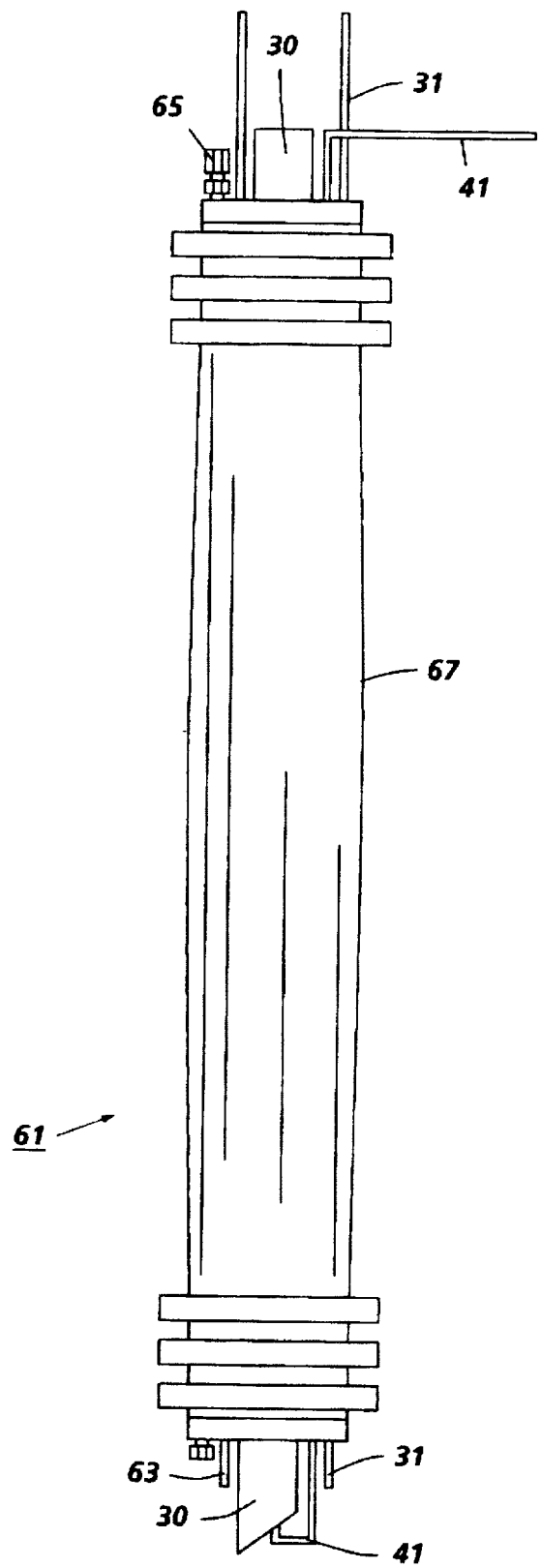

Illustrated schematically in FIGS. 12 and 13 are examples of packings suitable for use with the apparatus and process of the present invention.

Figure 14:
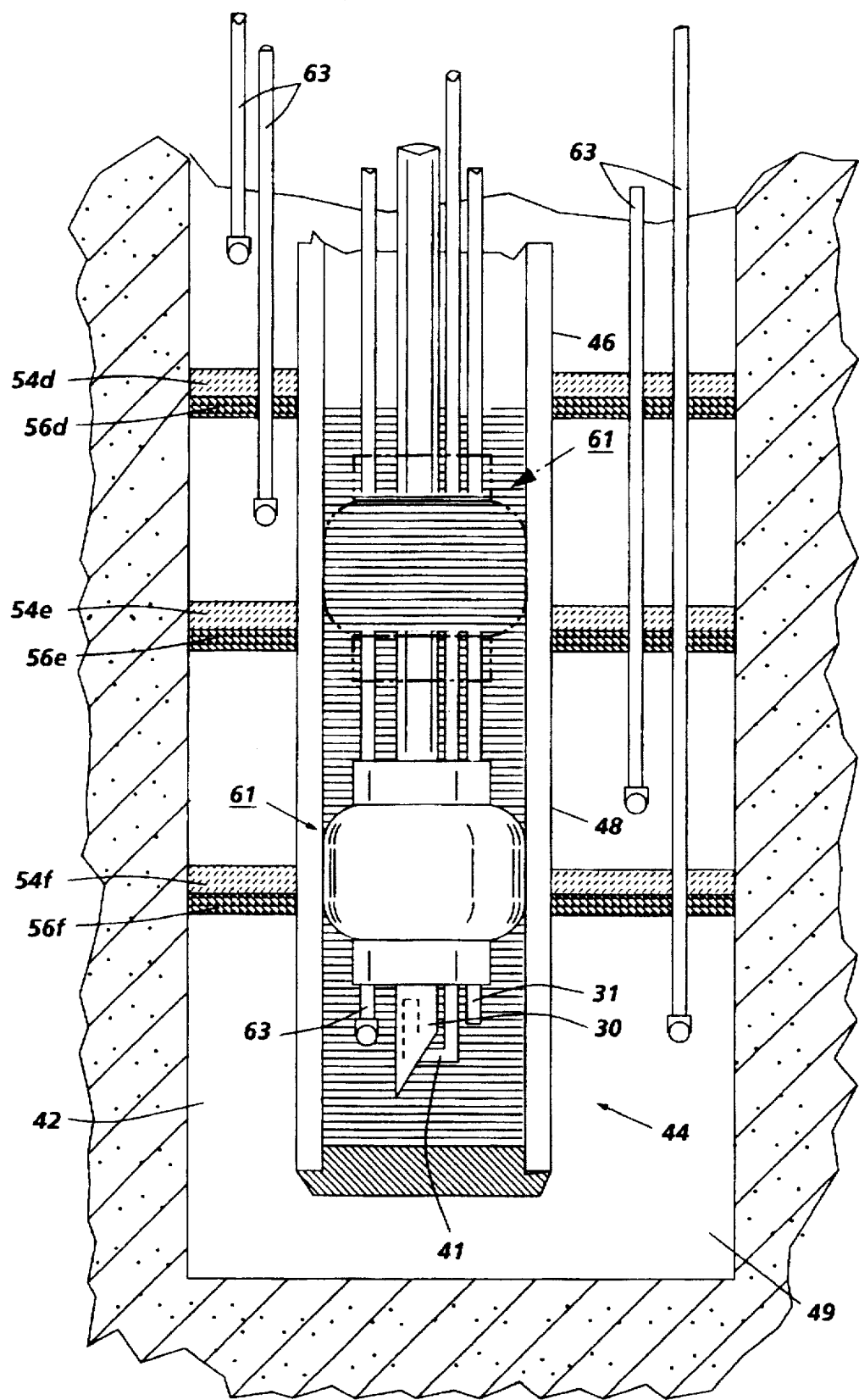
Figure 15:
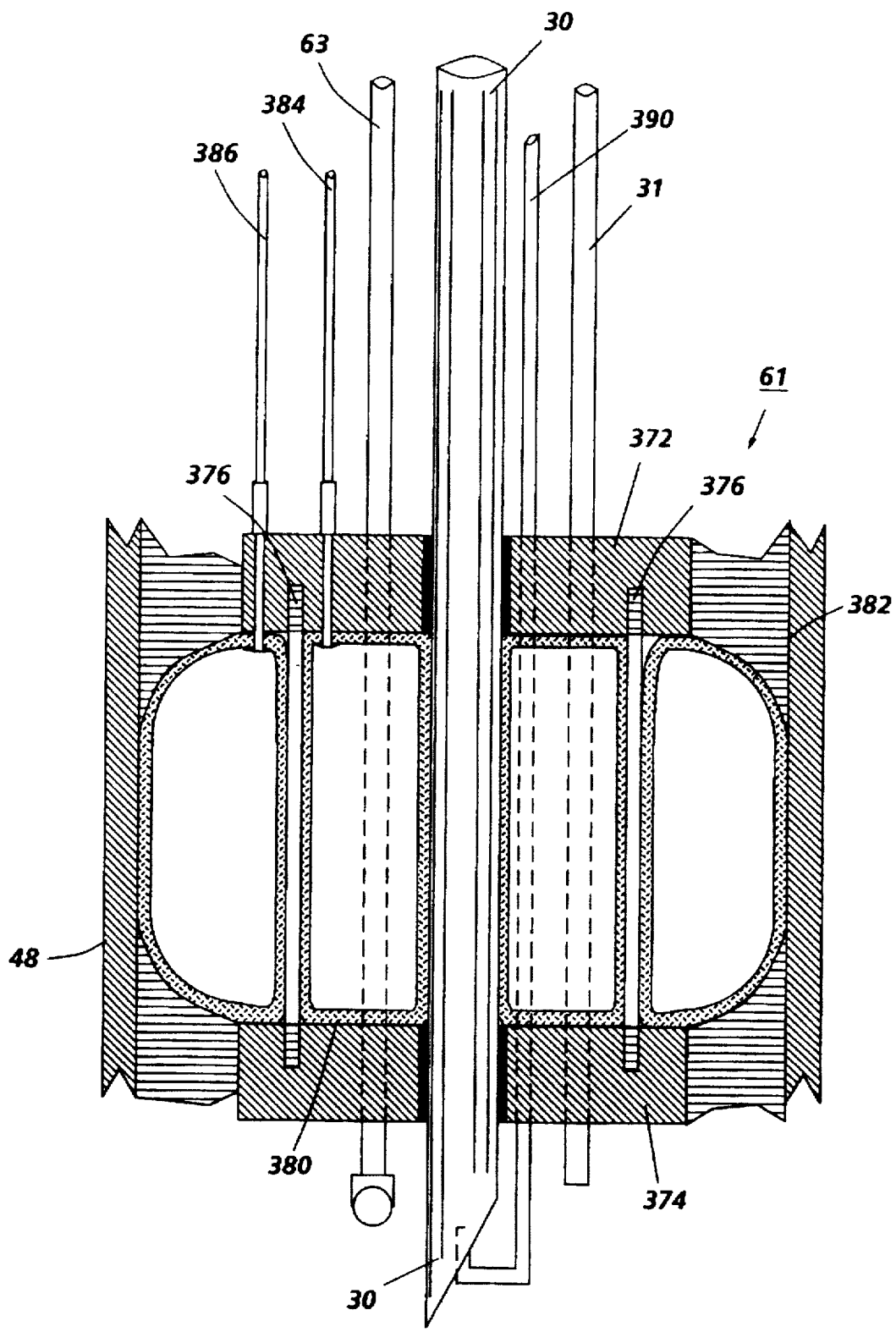

Illustrated schematically in FIGS. 14 and 15 are examples of another packing suitable for use with the apparatus and process of the present invention.

Figure 16:
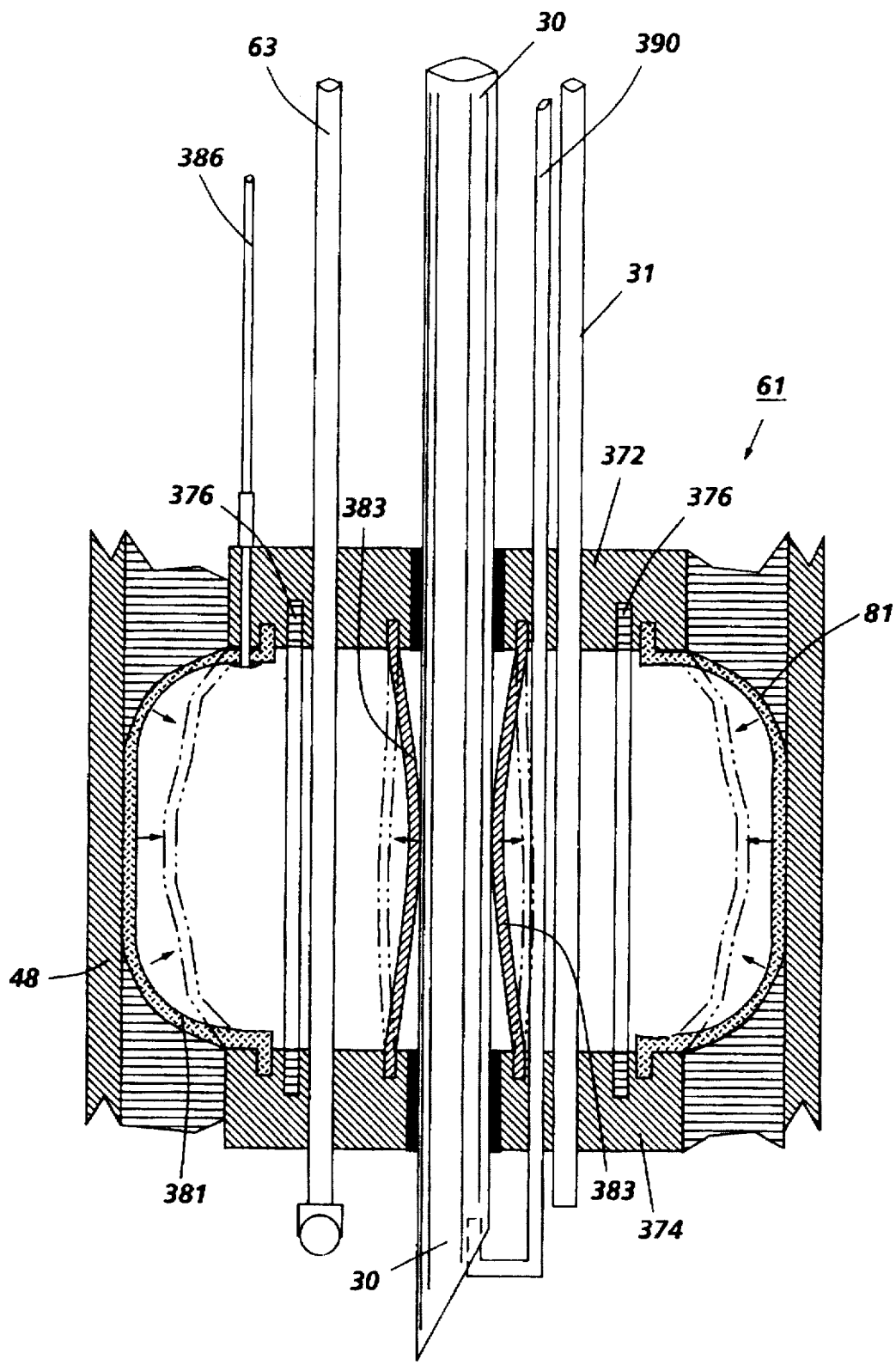

Illustrated schematically FIG. 16 is yet another example of a packing suitable for use with the apparatus and process of the present invention.

While the present invention will be described in connection with preferred embodiments thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

The present invention is directed to a process and apparatus for the removal of contaminants from bedrock, groundwater, and soil. The term "subsurface" is used herein to refer to topsoil, bedrock, and any soil or ground contained therebetween. Contaminants can be present in the vadose zone and/or below the water table. The process includes the steps of providing a borehole in the contaminated area, placing in the borehole a perforated riser pipe in which is situated a vacuum extraction pipe with an opening situated within the perforated riser pipe, applying a vacuum to the riser pipe through the vacuum extraction pipe so as to draw soil gases and entrained liquid into the riser pipe and to transport both the gases and the liquid to the surface through the vacuum extraction pipe, separating the liquid and the gases, and separately subjecting the separated liquid gases to appropriate treatment. Treated water can be returned to the soil or disposed of in conventional ways. The vacuum extraction pipe is surrounded with a riser pipe. The riser pipe is constructed with perforations (screening) which may be situated below the water table, in the unsaturated (vadose) zone, or both in the saturated and unsaturated zones, as well as within bedrock. In one embodiment, the riser pipe has perforations both above and below the water table. In another embodiment of the invention, the riser pipe is constructed with perforations (screening) extending only below the water table. In yet another embodiment of the invention, the riser pipe is constructed with perforations (screening) extending only above the water table. The unsaturated zone can be the natural vadose zone lying above the natural water table, or an expanded "artificial" vadose zone created when removal of the groundwater through the extraction well causes local lowering of the water table. Placing of the screening so that it extends both below the water table and into the vadose zone allows soil gases, including contaminants in the vapor phase, to be drawn into the riser pipe under the influence of a vacuum generator connected to the vacuum extraction pipe. The gases entrain the liquid phase, so that both phases can be transported to the surface together in a common stream through the vacuum extraction pipe. At the surface, the two phases are separated in a vapor-liquid disengaging vessel, such as a cyclone separator, knock-out pot or other suitable component, and after separation the two phases can individually be routed to systems for contaminant removal by further treatment steps. Suitable processes for contaminant removal include filtration, adsorption, air stripping, settling, flocculation, precipitation, scrubbing and the like.

As an alternative, the riser pipe can be situated so that the screening is at all times below the water table, even in the situation in which removal of water causes local depression of the water table. In such an arrangement, the fluid transported to the surface from the riser pipe is predominantly in the liquid phase, although it may still be necessary to provide vapor-liquid separation and individual phase treatment at the surface to deal with phase transformation which may occur as a result of turbulence and pressure reduction at the suction side of the vacuum device.

Figure 1:
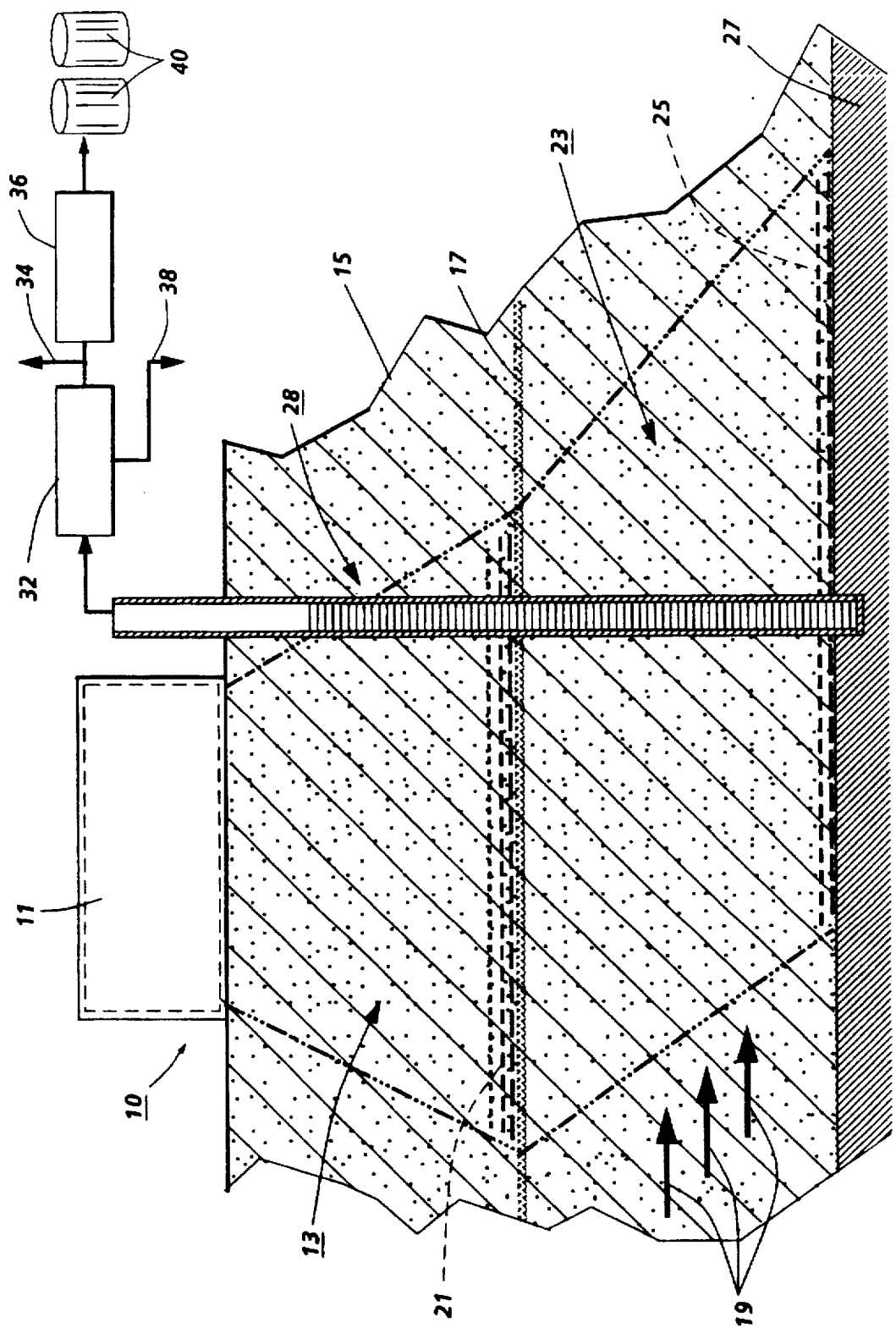
Figure 2:
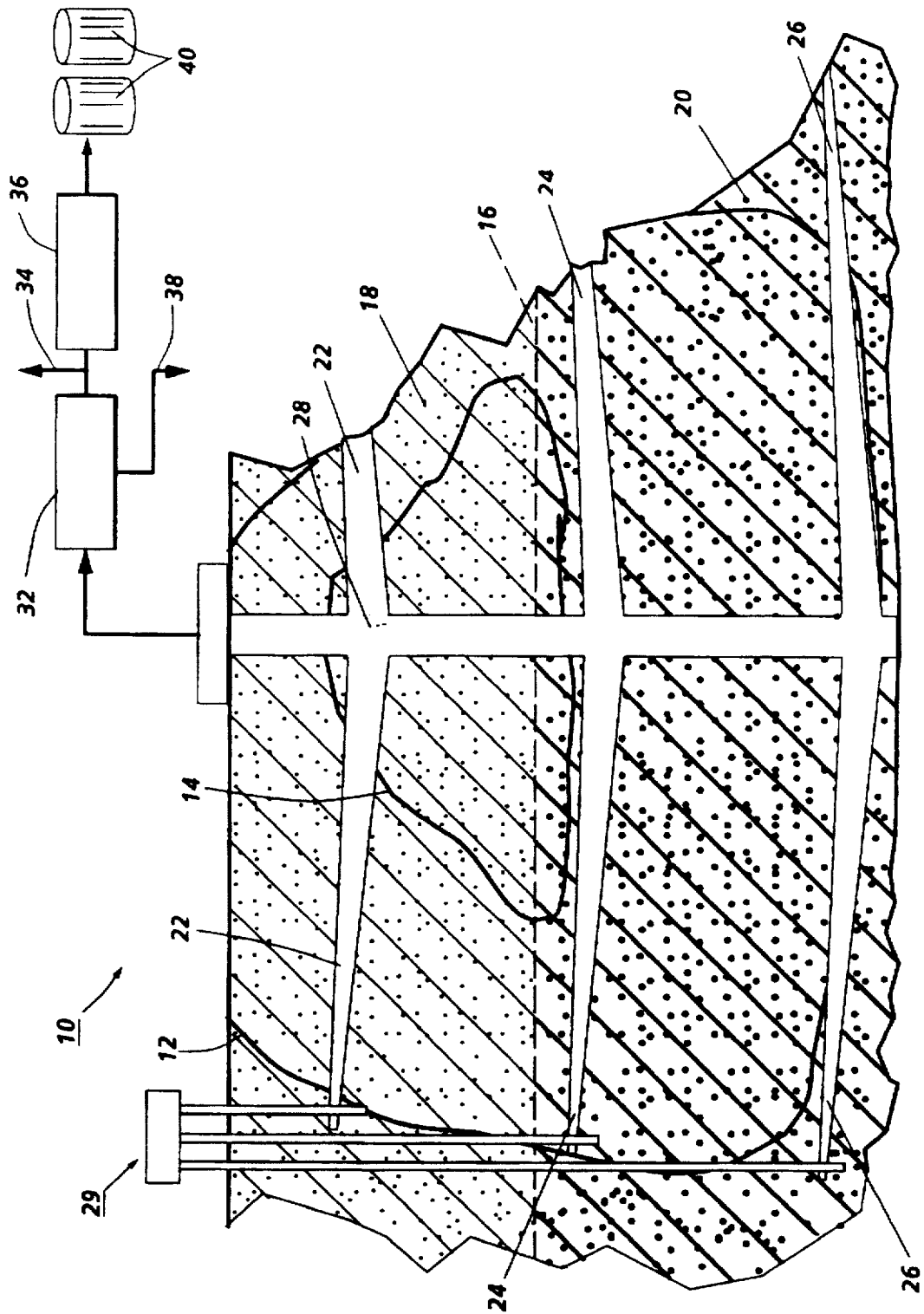
FIG. 2 is a side elevation view in cross section illustrating a general arrangement for vacuum extraction of contaminants from a contaminated area of the subsurface in accordance with the present invention when preferential flow paths in the surrounding soil have been established.

FIGS. 1 and 2 (not drawn to scale) illustrate schematically systems, designated generally by the reference numeral 10, for vacuum extraction and treatment in accordance with the invention. Seen in FIG. 1 is a source 11 of volatile contaminants, creating a plume 13 of adsorbed, dissolved, or suspended free phase and gaseous phase contaminants in the soil 15 of the vadose (unsaturated) zone. The contaminants making up the plume 13 tend to leach or percolate downwardly toward the natural water table 17. Groundwater is moving in the direction of the arrows 19. Components lighter than water and not dissolved are depicted by the reference numeral 21, and tend to float at the top of the water table. Dissolved contaminants tend to percolate downwardly in a plume 23 below the water table 17, and free-phase components 25 heavier than water tend to migrate downwardly to the aquitard 27. Seen in FIG. 2 is a contaminated zone 12, wherein the contaminants in central zone 14 are more highly concentrated in the soil than in surrounding zone 12. The contaminants are adsorbed, dissolved, or suspended free phase and gaseous phase contaminants in the soil. As illustrated in FIG. 2, dashed line 16 represents the interface between upper soil 18, which typically is more permeable than lower soil 20. For example, upper soil 18 may be weathered clay, with a typical permeability of about $1 \times 10^{-7}$ centimeters per second, and lower soil 20 may be unweathered clay, with a typical permeability of about $1 \times 10^{-8}$ centimeters per second. It is not required, however, for the purposes of the present invention, that contaminated zone 12 extend into two or more areas of differing soil permeability; contaminated zones 12 and 14, preferential flow paths 22, 24, and 26, and extraction well 28 may all be situated within soil of a single permeability. Within the soil containing contaminated zone 12 are paths of preferential flow 22, 24, and 26, wherein the soil is significantly more permeable than either upper soil 18 or lower soil 20. In many instances, the permeabilities of soil within the preferential flow paths can be at least one order of magnitude greater than the permeability of the soil surrounding the preferential flow paths. For example, the surrounding soil might have a permeability of about $1 \times 10^{-4}$ centimeters per second or less while the paths of preferential flow might have permeabilities of $1 \times 10^{-3}$ centimeters per second or greater. Paths of preferential flow, however, can also be established between areas with only slightly differing permeabilities, since flow will favor the path of least resistance. These paths of preferential flow may be either naturally occurring or may be artificially created in the contaminated area. Artificial preferential flow paths can be created by, for example, fracturing processes, wherein relatively permeable flow areas are created within relatively impermeable soil. For example, hydraulic fracturing entails driving a casing and a lance tip, said casing and lance tip being of any suitable material, such as steel or the like, into the soil to the desired depth of the fracture closest to the surface. Thereafter, an extension rod is driven into the casing to drive the lance tip further into the soil, to a depth below the terminal end of the casing. The extension rod and lance tip are thereafter removed from the casing, leaving the empty casing in the ground with a well of exposed soil below the terminal end of the casing. A notch is then cut in the soil below the terminal end of the casing by a cutting jet of water, said notch extending horizontally and perpendicular to the vertical casing. Thereafter, a sand-filled slurry is injected under pressure into the casing; the casing prevents diffusion of the slurry in all areas except the exposed soil within the notch below the terminal end of the casing, and the pressure causes a horizontal hydraulic fracture to be extended from the notch edges. The fracture thus created contains sand, which assists in prevention of future collapse of the fracture, and enables gases and liquids to flow through the fracture at rates significantly higher than are possible in the relatively impermeable surrounding soil. Thereafter, additional fractures can be created at progressively lower levels by inserting a longer casing and the lance tip into the original hole in the ground and driving them to the desired depth, followed by cutting of a new notch at a lower level and injection of the slurry to create a new fracture. Fractures can be created at any desired spacings, typically at least 6 inches (15 centimeters) apart, although the distance between fractures may be lower if desired. In a preferred embodiment, the slurry injected into the fractures comprises a mixture of sand, water, and crosslinked guar gum, the mixture being highly viscous. The mixture also includes a chemical agent such as an enzyme that attacks the crosslinking in the guar gum, so that over a period of time, typically about 1 or 2 days, the crosslinking in the guar gum breaks down, thereby lowering the viscosity of the slurry. Thereafter, the water drains from the slurry, leaving the sand remaining in the fracture. One example of a suitable commercially available additive to a sand/water slurry for this purpose is the REVERT® drilling fluid additive, available from Johnson Filtration Systems, Inc., St. Paul, Minn. This material contains guar gum and initially enhances the viscosity of the slurry, followed by a breakdown of the guar gum and resulting decreased viscosity within a few days.

Optionally, air inlet probes 29 may be provided within one or more of preferential flow paths 22, 24, and 26. The air inlet probes allow air or other fluids (liquids and/or gases) to be introduced into the preferential flow paths at a location spaced from the well, said fluids then being extracted through the well bore. This arrangement may be beneficial in situations where insufficient communication otherwise exists between the atmosphere and the extraction well or if the soil is incapable of yielding sufficient air flow. An extraction well 28, which will be described in greater detail shortly, is sunk in the area of the contaminated zone. As illustrated schematically in FIG. 1, extraction well 28 is sunk in the area of the plume 13 and extends through the vadose zone 15 and below the natural water table 17. As illustrated schematically in FIG. 2, extraction well 28 is sunk in contaminated zone 12 and extends through the upper soil 18 and into the lower soil 20. Associated with the extraction well 28 is a vacuum extraction system, designated by the reference numeral 32, preferably designed to generate high vacuum conditions, typically from about 7 to about 29 inches of mercury. Gases removed by the vacuum extraction system 32 can be vented to atmosphere at 34 if within acceptable environmental limits, or further processed, such as by being incinerated or passed to a condenser, granular activated carbon filter, or other such component 36. The component 36 serves to remove contaminants from the extracted gases. Water extracted by the process can be treated by passing it through conventional systems for metals removal, volatile organic compound removal, or other steps of purification. The treated and purified water, if it is of sufficient purity at this stage, can be returned to any appropriate discharge point as indicated at 38. Contaminants can be stored in drums 40 for eventual destruction or further processing.

FIGS. 3 and 4 (not drawn to scale) illustrate embodiments of extraction well 28 in greater detail. As illustrated schematically in FIGS. 3 and 4, the extraction well 28 in the illustrated form of the invention includes an elongated borehole 42, into which is placed a perforated riser pipe 44 capped at the bottom. The riser pipe 44 is perforated either above the water table, below the water table, or both below and above the water table. In the embodiments illustrated, the riser pipe includes an imperforate upper portion 46 and a perforate (screened) lower portion 48. The riser pipe 44 can be of any suitable material, such as polyvinyl chloride, metals, such as stainless steel, galvanized steel, or the like, plastics, including Teflon®, or the like. The screened or perforate portions can have perforations of any desired or suitable shape and size; for example, in one embodiment, the perforated portion can be equipped with 0.010 inch slots. Situated inside riser pipe 44 is vacuum extraction pipe 30. The vacuum extraction pipe 30 can be of any suitable material, such as polyvinyl chloride, metals, such as stainless steel, galvanized steel, or the like, plastics, including Teflon®, or the like. The upper end of the riser pipe 44 is here shown to be associated with a concrete floor or deck, and is provided with a suitable pipe fitting 52, enabling the riser pipe 44 and the vacuum extraction pipe 30 to be coupled to the remainder of the vacuum extraction system 32 (not seen in FIGS. 3 and 4), with vacuum extraction pipe 30 being in fluid communication with the vacuum extraction system. Vacuum extraction pipe 30 can have a bottom opening within the riser pipe 44 either below the water table, at the water table level, or above the water table. While not necessary, it is preferred that the bottom of vacuum extraction pipe 30 terminate at an angle other than exact parallel with the horizontal; by terminating the pipe at an angle, the surface area of the opening is increased, which enhances the ease of starting the well. Preferred angles for the bottom opening of vacuum extraction pipe 30 are from about 10° to about 80° with respect to the horizontal, and more preferably about 45° with respect to the horizontal, although the angulation can be outside this range.

As illustrated schematically in FIG. 4, the preferential flow paths 22, 24, and 26 are isolated from each other by layers of relatively impermeable soil (or rock) and, within the borehole, by essentially impermeable seals surrounding the impermeable portion 46 of riser pipe 44. For example, as illustrated in FIG. 4, preferential flow path 22 is isolated within borehole 42 and riser pipe 44 by grout layers 54a and 54b and by bentonite cement layers 56a and 56b. Preferential flow path 24 is isolated from preferential flow paths 22 and 26 within borehole 42 and riser pipe 44 by grout layers 54b and 54c and by bentonite cement layers 56b and 56c. Sand 49 situated within the borehole 42 supports the bentonite cement and grout layers within the borehole 42 and riser pipe 44. Any other suitable or desired materials can also be employed for isolating the preferential flow paths from each other, such as other grouts, bentonite clays, nonshrink epoxy materials, hydraulic cements, plastics, rubber materials, or the like.

In one embodiment of the present invention, situated at the end of extraction well 28 at or near the ground surface are one or more optional air inlets 31 associated with riser pipe 44, said optional inlet 31 preferably being equipped with an air flow gauge (not shown), which permits the introduction of air at any desired pressure, including reduced pressures, atmospheric pressure, or increased or forced pressures, into riser pipe 44. When it is desired to add air at pressures greater than atmospheric pressure, air pressure can be provided by an additional pump (not shown), by connecting the outlet or exhaust of the vacuum pump connected to vacuum extraction pipe 30 to air inlet 31, or the like. The air flow rate through air inlet 31 can range from nearly zero to any value less than the CFM rated capacity of the vacuum pump connected to vacuum extraction pipe 30. While some air flow may be desired at system start-up, after the process has been in operation for a period of time, the air flow may in some instances be reduced to zero, with no air being introduced into the well through air inlet 31 and maximum vacuum being applied to the sub-surface soil and water. In addition, the air introduced through air inlet 31 can, if desired, be heated to improve the extraction of some contaminants. Further, air inlet 31 can be used as an inlet for introducing other materials or chemicals into the riser pipe and extraction stream, since chemicals or materials so introduced will pass down with the inlet air through the riser pipe to the bottom thereof, and then back up with the water and air mixture through vacuum extraction pipe 30, thus chemically or otherwise interacting with the water and air mixture. For example, oxidizers or surfactants or other chemicals can be introduced for the treatment of water-borne or vapor-borne contaminants removed by the vacuum extraction pipe. Additionally, in situations wherein the apparatus and process of the present invention are employed in conjunction with a biotransformation process, wherein soil contaminants are biologically transformed into innocuous materials by interaction with bacteria or other biological methods, gas inlet or inlets can be employed to introduce into the vacuum extraction pipe nutrients for biotransformation, such as cellulose or the like, or for introducing nitrogen to enhance anaerobic processes or oxygen to enhance aerobic processes. Further information regarding biological processes for treating soil contaminants is disclosed in, for example, W. K. Ahlert et al., "In situ Bioremediation of Soil Contaminated with Methyl Benzene Species," M. A. Franson, "In Situ Bioremediation of Unleaded Gasoline Contaminated 6round Water, Plainfield, Conn., A Case Study," and M. Leavitt et al., "Implications of Surfactant Augmentation for In Situ Bioremediation Systems," all contained in *In Situ Treatment of Contaminated Soil and Water*, Proceedings of the 1992 U.S. EPA/A&WMA International Symposium, Air and Waste Management Association (Pittsburgh 1992); and Subsurface Restoration Conference, Jun. 21–24, 1992, Dallas, Texas (Rice University Dept. of Envi. Sci. & Eng., Houston, Tex. 1992); the disclosures of each of which are totally incorporated herein by reference.

Liquid drawn up through vacuum extraction pipe 30 preferably, although not necessarily, is in two-phase form, namely droplets, mist, and/or vapor entrained in liquid, as opposed to slug flow. Air flow through the system is provided by one or more of the following: air from the unsaturated (vadose) zone; air from the dewatered saturated zone; air from one or more of the optional air inlet mechanisms 31, at reduced pressures, atmospheric pressure, or forced pressures; air from optional gas inlet or inlets 41 at atmospheric pressure or forced pressures; and air introduced through one preferential flow path and extracted from another preferential flow path. Thus, it is not required that air be extracted from the ground in the vicinity of the extraction well. Generally, a high vapor/air velocity is maintained through the system. Air velocity in the vacuum extraction pipe should be sufficient to carry or lift water in the vapor phase, either droplets of various sizes, or the like, entrained in the air. Air velocity values in the range of from about 1 foot per second to about 200 feet per second or greater generally suffice.

Vacuum extraction pipe 30 can optionally be equipped with at least one gas inlet 41. As illustrated in FIGS. 3 and 4, vacuum extraction pipe 30 is equipped with a single optional gas inlet 41. More specifically, as shown in FIGS. 3 and 4, optional gas inlet 41 enters vacuum extraction pipe 30 from the bottom opening of vacuum extraction pipe 30. Alternatively (not shown), gas inlet 41 can enter vacuum extraction pipe 30 through an opening in the side of vacuum extraction pipe 30. Gas inlet 41 is in fluid communication with a gas supply, which can be either atmospheric air or some other desired gas, and with optional air compressor 43. A tank containing compressed air can also serve as the gas supply. The gas supply to gas inlet 41 is controlled through valve 45 and the pressure in gas inlet 41, if desired, can be monitored with optional pressure gauge 47. In addition, if desired, an automatic controller for turning valve 45 on and off and/or for controlling the duration and/or pressure of the gas applied to vacuum extraction pipe 30 from gas inlet 41 can be added to the configuration of gas inlet 41.

In operation, gas is introduced into vacuum extraction pipe 30 either before, while, or after a vacuum is applied to vacuum extraction pipe 30 to initiate two-phase flow within vacuum extraction pipe 30. In the embodiment wherein vacuum extraction pipe 30 is equipped with a single gas inlet 41 as illustrated in FIGS. 3 and 4, gas is applied through gas inlet 41 continuously as vacuum is applied to vacuum extraction pipe 30 until two-phase flow is established within vacuum extraction pipe 30, at which point the flow of gas through gas inlet 41 is halted. The actual duration for application of gas through gas inlet 41 will vary depending on factors such as the depth of the well, the depth within the well of the gas inlet 41, the depth of groundwater contained within vacuum extraction pipe 30, the dimensions of the well, vacuum extraction pipe 30, and gas inlet 41, the pressure of gas applied through gas inlet 41, and the like. Typical duration times for wells 4 inches in diameter and wherein gas is introduced at a pressure of from about 20 to about 60 pounds per square inch are from about 15 to about 20 seconds when the groundwater level is less than 15 feet deep and about 45 seconds when the groundwater level is from about 18 to about 25 feet deep. In some instances, durations for applying gas through gas inlet 41 may be 5 minutes or greater.

In embodiments of the present invention wherein vacuum extraction pipe 30 is equipped with a multiplicity of gas inlets, gas is typically applied first through the uppermost gas inlet continuously as vacuum is applied to vacuum extraction pipe 30 until two-phase flow is established within vacuum extraction pipe 30 from the depth of the uppermost gas inlet. At this point, the flow of gas through the inlet next in depth is initiated and maintained until two-phase flow is established within vacuum extraction pipe 30 from the depth of this gas inlet. Subsequently, the flow of gas through the inlet next again in depth is initiated and maintained until two-phase flow is established within vacuum extraction pipe 30 from the depth of this next gas inlet. The flow of gas through each inlet can be terminated once two-phase flow is established from that depth, although it is preferred to maintain at least some overlap between the flow of gas through one inlet and the flow of gas through the inlet next in depth to ensure that two-phase flow does not cease in the vacuum extraction pipe at any time. For example, in a particular well, gas might be introduced first through the uppermost gas inlet for a period of about 10 seconds, after which two-phase flow is established within the vacuum extraction tube from the depth of the uppermost gas inlet, followed by maintaining gas flow through the uppermost gas inlet while also permitting gas to flow through the gas inlet next in depth for a period of about 5 seconds, followed by terminating the flow through the uppermost gas inlet while allowing gas to continue to flow through the gas inlet next in depth for a period of 15 seconds, after which two-phase flow is established within the vacuum extraction tube from the depth of this next gas inlet, and the like for any additional inlets. The duration of flow through each inlet and the duration of overlap for flow from two or more inlets will vary with each well. It is also possible, however, to initiate flow through each inlet sequentially, with no overlap between the flow through one inlet and the flow through another inlet, or to initiate flow in multiple inlets in some order other than sequentially by increasing depth. Further, flow through multiple gas inlets can be initiated simultaneously. If desired, the flow duration through each gas inlet can be controlled automatically by running each gas inlet through a timer control system.

Generally, flow through the gas inlet or inlets is ceased once the two-phase vacuum extraction process has been successfully initiated. At various times in the extraction process, however, the flow through the vacuum extraction pipe 30 may vary from the desired two-phase flow to some other form of flow, such as slug flow. At these times, gas may also be introduced through gas inlet or inlets 41 to convert the flow in the vacuum extraction pipe 30 back to the desired two-phase form.

The gas inlet or inlets can be of any suitable configuration. As illustrated schematically in FIGS. 3 and 4, gas inlet 41 enters vacuum extraction pipe 30 through an opening in the side of vacuum extraction pipe 30 the bottom opening of vacuum extraction pipe 30. While not required, it is preferred that the opening of gas inlet 41 be situated in relative close proximity to the inner wall of vacuum extraction pipe 30 to minimize frictional forces as air is introduced into vacuum extraction pipe 30 through gas inlet 41 to initiate two-phase flow of gas and liquid in vacuum extraction pipe 30. Additional suitable configurations for gas inlet 41 are disclosed in, for example, U.S. Pat. No. 5,358,357, the disclosure of which is totally incorporated herein by reference.

The optional gas inlet or inlets 41 can be either flexible or rigid, and can be of any suitable material, such as polymers and plastics, including polyvinyl chloride, Teflon®, polyethylene, polypropylene, or the like, metals, such as stainless steel, galvanized steel, copper, brass, or the like, or any other suitable material. The gas inlet or inlets 41 can be of any desired or suitable dimensions to enable the desired rate of flow through the vacuum extraction pipe, and typically will vary depending on the dimensions of the vacuum extraction pipe, the depth of the well, the nature of the packing around the well, and the like.

Any desired pressure can be employed for the gas introduced into vacuum extraction pipe 30 through gas inlet or inlets 41. Typical pressures range from atmospheric pressure outside the well (in which case no air compressor is required) to about 100 pounds per square inch, with preferred pressures being from about 20 to about 60 pounds per square inch, more preferably from about 30 to about 50 pounds per square inch, although the pressure can be outside these ranges. Greater pressures initiate two-phase flow within the vacuum extraction pipe more rapidly, and may also be more desirable at greater relative depths of water (with relative depth in this instance referring to the difference in depth between the gas inlet and the groundwater level within the vacuum extraction pipe).

Any desired gas can be introduced into the vacuum extraction pipe through the optional gas inlet or inlets. Ambient air may be selected as the most inexpensive gas. In addition, the air introduced through gas inlet or inlets 41 can, if desired, be heated to improve the extraction of some contaminants. Further, gas inlet or inlets 41 can be used as an inlet for introducing other materials or chemicals into the riser pipe and extraction stream for chemically or otherwise interacting with the water and air mixture. For example, oxidizers or surfactants or other chemicals can be introduced for the treatment of water-borne or vapor-borne contaminants removed by the vacuum extraction pipe. Additionally, in situations wherein the apparatus and process of the present invention are employed in conjunction with a biotransformation process, wherein soil contaminants are biologically transformed into innocuous materials by interaction with bacteria or other biological methods, the gas inlet or inlets can be employed to introduce into the vacuum extraction pipe nutrients for biotransformation, such as cellulose or the like, or for introducing nitrogen to enhance anaerobic processes or oxygen to enhance aerobic processes.

Returning to FIGS. 3 and 4, the upper portion 46 of the riser pipe 44 is surrounded by a seal. In the illustrated embodiment, the seal comprises low permeability grout, such as bentonite cement (54 in FIG. 3, 54a in FIG. 4), and below the grout a bentonite seal (56 in FIG. 3, 56a in FIG. 4). As shown in FIG. 4, optional additional seals (optional additional layer of grout 54b and optional additional layer of bentonite cement 56b) isolate preferential flow path 22 from preferential flow path 24, and optional additional seals (optional additional layer of grout 54c and optional additional layer of bentonite cement 56c) isolate preferential flow path 24 from preferential flow path 26. Relatively low permeability sand 49 is situated within borehole 42 between the seal layers to support the seal layers within the borehole. When preferential flow paths are created intentionally as fractures, sand 49 preferably is also contained within fractures 22, 24, and 26 to prevent collapse of the fractures. The area within the borehole 42 surrounding the slotted lower portion 48 of the riser pipe 44 and part of the upper portion 46 above the slotted lower portion 48 is packed with fine screened sand 49, to facilitate the flow of gas and liquid from the surrounding soil into the riser pipe 44.

Packing 61 is situated between vacuum extraction pipe 30 and riser pipe 44 and is capable of filling a portion of the annular space between the outer diameter of vacuum extraction pipe 30 and the inner diameter of riser pipe 44 and isolating the area below packing 61 from the area above packing 61 in the space between vacuum extraction pipe 30 and riser pipe 44. (By a portion of the annular space it is meant that the packing does not extend for the entire vertical depth of the well, but isolates one vertical portion of the well from another vertical portion of the well.) Packing 61 can be any suitable packing, gasket, or seal which enables vacuum applied from vacuum extraction pipe 30 to be isolated from the area between the riser pipe and the vacuum extraction pipe which is above the packing. One or more packings 61 can be present within riser pipe 44. Examples of suitable configurations include inflatable bladders, solid rubber, plastic, or metal members, one or more O-rings or other cylindrical rings, dynamic packings such as those employed in hydraulic equipment, piston packings, rod or shaft packings, plunger packings, spring-loaded packings, flange packings, nested V rings, conical rings, soft packings, jamb packings, plastic packings, automatic packings, oil seals, pneumatic or inflatable packings, or the like. In one embodiment, packing 61 can be actuatable, enabling the packing to be moved easily within riser pipe 44 and/or around vacuum extraction pipe 30 before actuation of the seal between the vacuum extraction pipe and the riser pipe. Actuation can be by any desired method, such as filling of a bladder with a fluid (which can be a liquid, a gas, a gel, or the like), expansion of a solid expandable material, or the like. Packing 61 can be either permanently or removably attached to either vacuum extraction pipe 30, riser pipe 44, or both, and can be either stationary or positionally variable in depth within the riser pipe. In one preferred embodiment, one or more packings 61 are attached to vacuum extraction pipe 30 and the depth of packing 61 within riser pipe 44 is adjustable by adjusting the depth of the opening of vacuum extraction pipe 30 within riser pipe 44. In another preferred embodiment, one or more packings 61 are not permanently affixed either vacuum extraction pipe 30 or to riser pipe 44, but are suspended within riser pipe 44 around vacuum extraction pipe 30 and can be independently adjusted in depth within riser pipe 44. Also suitable, however, are other configurations, such as one or more packings 61 attached to riser pipe 44 through which vacuum extraction pipe 30 passes and which permit adjustment of the depth of vacuum extraction pipe 30 within riser pipe 44, or the like. Optional gas inlet 41 can, if desired (and as illustrated schematically in FIGS. 3 and 4), pass through packing 61 to enable introduction of air through gas inlet 41 into vacuum extraction pipe 30 at a depth below packing 61. Similarly, optional air inlet 31 can, if desired (and as illustrated schematically in FIGS. 3 and 4), pass through packing 61 to enable introduction of air through air inlet 31 into the area between vacuum extraction pipe 30 and riser pipe 44 at a depth below packing 61.

In soils such as those illustrated schematically in FIG. 3, wherein no preferential flow paths have as yet been established, the opening of vacuum extraction pipe 30 and the depth of packing or packings 61 can be adjusted periodically to prevent formation of preferential flow paths. As illustrated schematically in FIG. 3, if desired, portions of riser pipe 44 can optionally be further isolated from each other with optional additional seals (in the illustrated embodiment, optional additional low permeability grout layers 54d, 54e, and 54f and/or optional additional bentonite seals 56d, 56e, and 56f). Any suitable impermeability material can be employed for the additional seals. The optional additional seals can be of any desired or effective thickness, typically from about 1 inch to several feet in thickness, preferably from about 2 inches to several feet (but less than the entire depth of the well) to prevent vapor flow from one isolated zone to another. These additional isolation seals create isolated zones within riser pipe 44 and can be placed at desired intervals throughout the vertical extent of the borehole 42. The isolation units partition sand within the borehole and reduce or eliminate delivery of vacuum to any zone within riser pipe 44 situated above packing 61. A pressure gradient is thus created from outside the borehole to the area within riser pipe 44 below packing 61. Additionally, if desired, optional vacuum probes 63 can be situated between each isolated zone to enable measurement of the vacuum below the isolated zone and to confirm or quantify the extent to which the zone above packing 61 has been isolated from vacuum.

FIG. 5 (not drawn to scale) illustrates schematically in greater detail one example of a vacuum extraction system 32 and steps and apparatus for treating extracted material. A vacuum pump 78, driven by electric motor 80, is in fluid communication through a pipe 82, knock-out pot 84 and pipe 86 with the pipe fitting 52 of extraction well 28. The knock-out pot 84 can be of conventional design, familiar to those skilled in the art.

The knock-out pot 84 serves to separate the two phases emerging from the extraction well 28, enabling them to be subjected to appropriate further processing. In this regard, a pipe 88 is provided in association with the knock-out pot 84, to conduct effluent in the liquid phase through filtration and stripping steps. Filtration is provided in the illustrated embodiment by parallel filters 90 and 92 which can alternately or simultaneously be used in a conventional manner. Cut-off valves, omitted in the drawings for clarity, permit either filter 90 or 92 to be isolated and each filter to be removed, cleaned, or replaced. Suitable pressure gauges (not shown) can be placed on the suction and discharge sides of the filters 90 and 92 to indicate filter loading. Other separation techniques and apparatus can also be used.

A pump 94, for erosion resistance preferably of the single stage progressive cavity type, serves to draw off the liquid phase effluent of the knock-out pot 84. Here, too, other suitable apparatus can be used.

In the illustrated embodiment, the liquid phase is fed from the pump 94 through filters 90 and/or 92 to a pipe 96 leading to an optional air stripper assembly 98, the function of which is to remove from the effluent volatile organic compounds. An optional blower 100 associated with the optional air stripper assembly 98 delivers a flow of warm air through the housing of the air stripper assembly 98, carrying off the volatile organic compounds through the vent 102 to atmosphere or further processing (not shown). An optional transfer pump 104, discharging to a pipe 106, serves to transport liquid from the sump of the air stripper assembly 98 for further processing. The transfer pump 104 can be turned off in response to a low level switch 108 associated with the air stripper assembly 98. A high level switch 110 associated with the air stripper assembly 98 controls the pump 94 in response to high water level in the air stripper assembly 98. The air stripper assembly 98 can be a conventional "off-the-shelf" unit, familiar to those skilled in the art.

The optional air stripper assembly 98 can, if desired, be omitted, and the effluent of the pipe 96 joined with the effluent of the pipe 120. It is hypothesized that the intimate mixing of the air and water during extraction (at which time groundwater is extracted in an air stream under vacuum) allows the volatile compounds to come out of solution, thus obviating the need for later air stripping.

Avoidance of the need for an air stripper assembly 98 also reduces the total volume of air streams bearing volatile organic compounds. In situations in which air emissions must be controlled, this is a distinct advantage. Another advantage of the two-phase vapor extraction process, as practiced without additional air stripping, is that due to the low pressure at which the vapor/liquid mixing and separation are accomplished, there is no less oxygenation of the water than would result from conventional air stripping. It is to be expected that lower dissolved oxygen levels will result in less corrosion and fouling of downstream components of the apparatus.

As indicated above, under the influence of the vacuum pump 78 the vapors separated from the two-phase effluent from the extraction well 28 are drawn to vacuum pump 78. In the illustrated embodiment of the invention, the vacuum pump 78 is of the liquid ring type, and is provided with a make up water line 112, served by a domestic supply. The make up water line 112 is provided with a solenoid actuated valve 114 responsive to the high water level switch 110 of air stripper assembly 98.

The pump 78 exhausts to a vapor/liquid separator 116, the vapor effluent of which is conducted to atmosphere, or if appropriate to further processing through a pipe 118. The bulk of the liquid effluent from the vapor liquid separator 116 passes through a pipe 120 to a sump 122, where it joins the effluent of the pipe 106, the liquid output of the air stripper assembly 98. A fraction or all of the liquid effluent of the vapor liquid separator 116 can be drawn off through a line 124 to join the flow in the make up water line 112 servicing the liquid ring pump 78.

An optional pump 126, controlled by a low level cut-off switch 128, draws liquid from optional sump 122 and propels it through a pipe 130 for further processing. In the illustrated embodiment, the liquid is passed in two stages through canisters 132 and 134 containing granular activated carbon. Other contaminant removal steps or techniques can be used. The treated water emerges through a pipe 136 and is of sufficient purity to allow its return to any suitable discharge point without further treatment.

FIGS. 6, 7, 8, and 9 (not drawn to scale) illustrate schematically the steps and apparatus for another method for treating soil liquids and gases containing contaminants. A vacuum inducing device 201, driven by electric motor 203, is in fluid communication through a pipe 205, vapor-liquid phase separator such as a knock-out pot 207, and pipe 209 with the pipe fitting 211 to one or more extraction wells 213. The knock-out pot 207 can be of conventional design, familiar to those skilled in the art, such as those fabricated or supplied by Burgess Manning, Anderson Separator, or the like. The vacuum inducing device 201 can be of any conventional design, such as a centrifugal blower, a vane type blower, a rotary blower, a liquid ring vacuum pump, or the like.

The knock-out pot 207 serves to separate mechanically the two phases emerging from the extraction well 213, enabling them to be subjected to appropriate further processing. In this regard, a pipe 215 is provided in association with the knock-out pot 207, to conduct effluent in the liquid phase to a pump 221 and then through optional filtration and, if desired, stripping steps. Optional filtration is provided in the embodiment illustrated in FIGS. 7, 8, and 9 by parallel filters 217 and 219 which can alternately or simultaneously be used in a conventional manner. Cut-off valves, omitted in the drawings for clarity, permit either filter 217 or 219 to be isolated and each filter to be removed, cleaned, or replaced. Suitable pressure gauges (not shown) can be placed on the inlet and discharge sides of the filters 217 and 219 to indicate filter loading. Examples of suitable filters 217 and 219 include cartridge or bag type filters as supplied by Cuno, Incorporated, Rosedale Products, Incorporated, 3M Filtration Products, Ronningen-Petter Filters, or the like. Other separation techniques and apparatus can also be used.

A transfer pump 221 serves to deliver the liquid phase effluent of the knock-out pot 207 to treatment. Examples of suitable transfer pumps include progressive cavity pumps or centrifugal pumps, as supplied by Robbins Meyers, Incorporated, Price Pump Company, Crane-Deming Pumps, Goulds Pumps Company, Bornemann, Inc., Moyno, Inc., or the like. Other similar apparatus can also be used.

Figure 6:
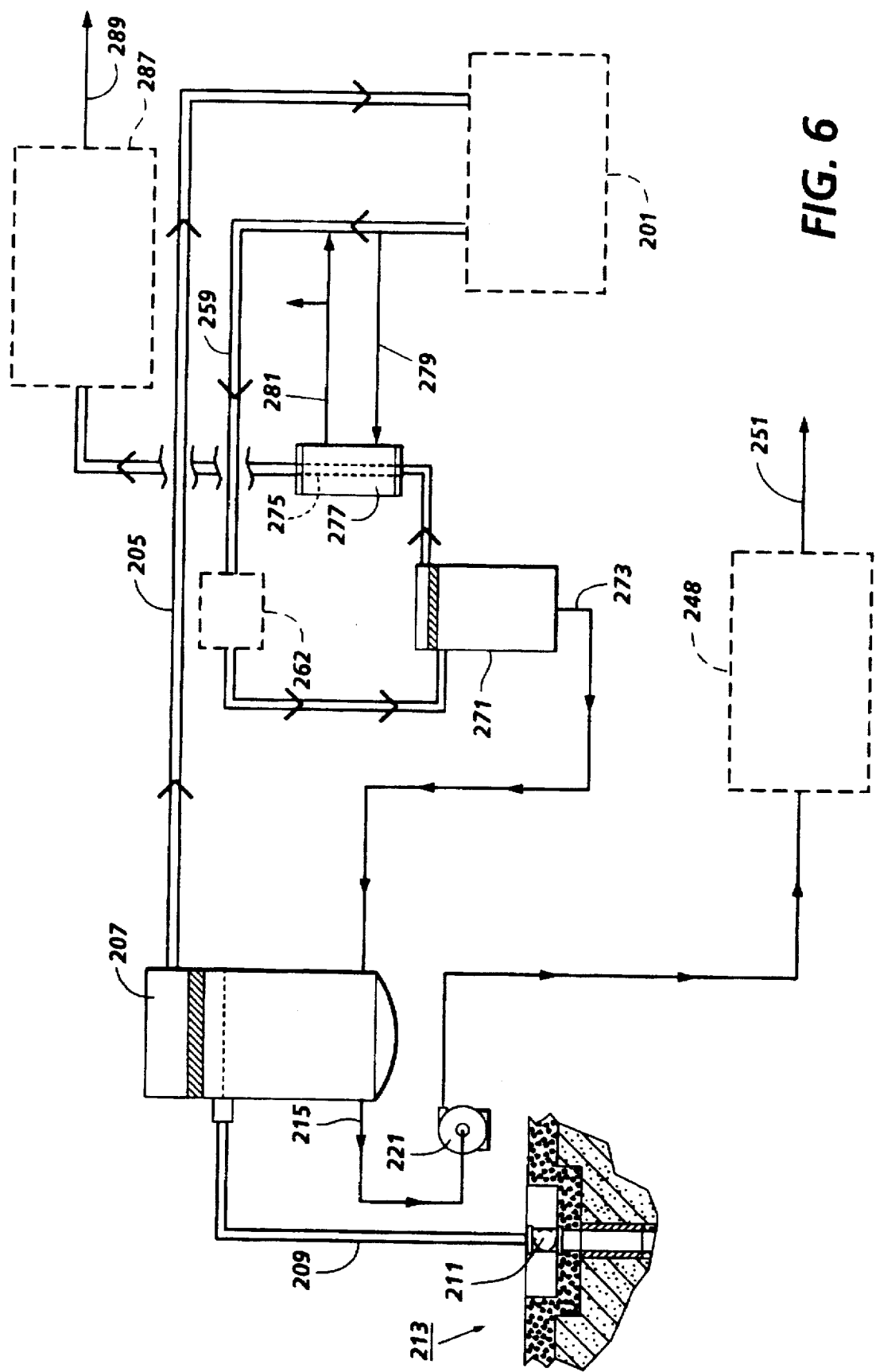

From optional filters 217 and 219, the liquid stream is routed for further processing, generally designated 248 in FIGS. 6, 7, and 8. Examples of suitable processing to remove contaminants, if present in the liquid phase, include carbon adsorption, advanced oxidation, biological treatment, resin adsorption, or the like. In the embodiment illustrated in FIG. 9, the liquid is passed in two stages through canisters 247 and 249 containing granular activated carbon, such as that available from Carbtrol Corporation, Envirotrol, or the like. Other contaminant removal steps or techniques can also be used. Final liquid phase effluent is delivered through pipe 251 to an appropriate discharge point.

As indicated above, under the influence of the vacuum inducing device 201 vapors separated from the two-phase effluent from the extraction well 213 are drawn to vacuum inducing device 201. In the embodiment of the invention illustrated in FIGS. 7 and 9, the vacuum inducing device 201 is a liquid ring vacuum pump. Examples of suitable commercially available liquid ring vacuum pumps include those available from Sihi Pumps, Nash Engineering, Trivini Pumps USA (Michigan City, Ind.), or the like. The liquid ring pump employs a seal liquid which acts as a sealant of the vacuum and which also acts as a recirculating coolant for the pump. For the present invention, while water is a suitable seal liquid, a relatively low vapor pressure liquid is the preferred seal liquid. Examples of preferred seal liquids include mineral oils, turbine oils, and the like. One preferred seal liquid is SAE 10 oil, such as those products available from Mobil Oil, Quaker State, or the like. Another example of a preferred seal liquid is a hydrotreated, highly refined, dewaxed paraffinic oil. The seal liquid preferably exhibits little or no volatility at the maximum operating temperature of the pump. Preferably, the seal liquid has a vapor pressure of less than about 25 mm Hg at the maximum operating temperature of the pump. The specific seal liquid selected may depend on considerations such as compatibility of the seal liquid with the specific organic contaminants expected to be recovered from the ground (preferably, the specific contaminants present are not highly soluble in the seal liquid), the temperature range at which the pump will be operated (preferably, the seal liquid does not volatilize or decompose at the pump operating temperatures, which typically are from about 50° to about 400° F., more typically from about 140° to about 250° F., and preferably from about 160° to about 185° F.), the viscosity of the seal liquid at both the projected operating temperature and the start-up temperature, and the like.

When a liquid ring vacuum pump is employed, as illustrated in FIGS. 7 and 9, the pump exhausts to an air-seal liquid separator 257, the vapor effluent of which is conducted to further processing through a pipe 259. The bulk of the seal liquid effluent from the air-seal liquid separator 257 is drawn off through a line 261 to join the flow in the seal liquid line servicing the liquid ring pump. The air-seal liquid separator 257 can be of any suitable or conventional design for coalescing of seal liquid mist and the gas stream. Examples of suitable coalescing mist elements include those available from Technolab, Osmonics, MechanEquip, or the like. The seal liquid exits the air-seal liquid separator 257 through pipe 261 to the seal liquid circulation pump 283. The circulation pump 283 can be of any suitable or conventional design, such as centrifugal pumps available from Price Pump Company, (Goulds Pumps Company, Burks Pumps, or the like. Heat is transferred from the seal liquid stream to the vapor stream by heater 277. The seal liquid stream is then returned to the liquid ring vacuum pump.

Subsequent to passing through the pump (and the air-seal liquid separator in FIGS. 7 and 9), the vapor stream is conducted through pipe 259 to a cooling system, generally designated 262 in FIG. 6. Any desired method may be employed for cooling the gaseous stream. For example, as illustrated in FIG. 7, the vapor stream first passes through after-cooler 264, which in the illustrated embodiment is an air-to-air heat exchanger. As shown in FIG. 7, the vapor stream passes from after-cooler 264 through condenser 263, an air-to-liquid heat exchanger which, in the illustrated embodiment is cooled by a jacket 265 of water from the liquid phase treatment process which enters jacket 265 through line 267 and exits jacket 265 through line 269. Examples of suitable air-to-air and air-to-liquid heat exchangers include those supplied by Airtek, Thermal Transfer Products, Ltd., Liebert Corporation, Bell and Gossett, or the like. While not required, in the embodiment illustrated in FIG. 7, it is preferred that the water enter jacket 265 subsequent to passing through filters 217 and 219 to minimize deposits of contaminants in jacket 265. If desired, however, the coolant in condenser jacket 265 can also be supplied from another source, such as an outside water supply, a recirculating coolant system, or the like. In another embodiment, as shown in FIG. 8, the vapor stream passes from pipe 259 to air-to-air heat exchanger 264, where the vapor stream is cooled and then conveyed to condensate separator 271. In yet another embodiment, as shown in FIG. 9, the vapor stream passes directly from pipe 259 exiting air-seal liquid separator 257 into condenser 263, which, in the illustrated embodiment, is cooled by a jacket 265 of water from a water supply which enters jacket 265 through line 267 and exits jacket 265 through line 269. Cooling system 262 may include any other suitable cooling methods, and is not limited to air-to-air heat exchangers or air-to-liquid heat exchangers.

The vapor and condensed liquid from cooling system 262 then enter condensate separator 271, where condensed liquid exits condensate separator 271 through pipe 273 and is conducted to the water treatment system at knock-out pot 207. Examples of suitable condensate separators include those available from Burgess Manning, Incorporated, Anderson Separator, or the like. Optionally, if desired, (not shown) condensate separator 271 can be equipped with multiple outlets to facilitate separation of water and liquid contaminants which have either a higher or lower specific gravity than water. An outlet situated at the bottom of condensate separator 271 enables draining of liquid contaminants with a specific gravity higher than that of water, and an outlet situated at or near the liquid level within condensate separator 271 enables draining of liquid contaminants with a specific gravity lower than that of water, in each instance permitting removal of the liquid contaminant from the condensate separator 271 prior to draining of the water.

Typically, as illustrated in FIGS. 6 through 9, the vapor stream passing through the cooling system (262 in FIG. 9, 263 and 264 in FIG. 7, 263 in FIG. 9, 264 in FIG. 8) is cooled from initial temperatures in the range of from about 100° to about 400° F to final temperatures in the range of from about 40° to about 100° F., more typically from about 60° to about 80° F. when water from the liquid stream is employed as the coolant as illustrated in FIG. 7, and to temperatures of from about 40° to about 60° F. when other cooling methods are employed, although the temperature can be varied as desired.

The vapor stream exiting condensate separator 271 is then heated in heater 275. Heater 275 employs the mechanical and compression heat generated by the vacuum inducing device 201, either as direct heating using discharge gases (for non-liquid sealed pumps) or heat recovery from circulating seal liquid (for liquid ring pumps), conveyed from vacuum inducing device 201 to heater 275 through a conduit 279 and either returned to vacuum inducing device 201 or otherwise disposed of through a conduit 281. For example, as illustrated in FIGS. 7 and 9, heater 275 provides heat via a jacket 277 of seal liquid from the liquid ring pump recirculating seal liquid system. Seal liquid enters jacket 277 through line 279, which conveys the seal liquid from the main seal liquid circulation system of the pump, and exits jacket 277 through line 281, which conveys the seal liquid back to the main seal liquid circulation system of the pump. Seal liquid in the recirculation stream is circulated by seal liquid circulation pump 283 and, if necessary, prior to re-entering pump 201, passes through air-seal liquid heat exchanger 285, where the seal liquid is cooled. Air-seal liquid heat exchanger 285 can be any suitable or desired arrangement for cooling the seal liquid, such as an air-to-air heat exchanger, an air-to-liquid heat exchanger, or any other suitable cooling apparatus. As illustrated in FIG. 8, when a non-liquid-seal pump, such as a rotary blower, is employed, heat is supplied to heater 275 by directing at least some of the exhaust vapors from the pump through conduit 279. The heated gases exit jacket 277 through line 281, and can either be directed back to pump 201 or vented to the atmosphere. Examples of suitable apparatus for heater 277 include heat transfer devices available from, for example, Thermal Transfer Products, Liebert Corporation, Bell and Gossett, or the like. Other heat transfer techniques and apparatus can also be used.

The vapor stream is heated to the desired temperature for further processing at heater 275; typically, this temperature is within the optimum range of temperatures for obtaining maximum efficiency with final vapor treatment processes. For example, when the vapor stream is subsequently treated with carbon filters, heater 275 typically heats the vapor stream to a temperature of from about 40° to about 140° F., more typically from about 50 to about 110° F, and preferably from about 60 to about 70° F., although the temperature can be outside these ranges. The vapor stream then enters the subsequent treatment system 287, where additional vapor phase contaminants are removed, and is vented to the atmosphere at exit 289. The treatment system 287 can be any desired method for removing contaminants from the gaseous stream, such as, for example, a carbon filtration system or other carbon adsorption device, a thermal oxidation system, a catalytic oxidation system, a biological treatment system, a resin adsorption system, or any other final treatment system appropriate for the contaminants of concern. As illustrated in FIG. 9, the treatment method is by carbon adsorption using granular activated carbon, such as that available from Carbtrol Corporation, Envirotrol, or the like.

FIGS. 10 and 11 (not drawn to scale) illustrate schematically examples of optional air inlets. FIG. 10 illustrates schematically an air inlet 57 suitable for the system generally depicted in FIG. 1 and FIG. 11 illustrates schematically an air probe 29 suitable for the system generally depicted in FIG. 2. The air inlet comprises a borehole 58, which receives a pipe 60. The pipe 60 in one operative embodiment comprises a four inch diameter PVC pipe, capped at the bottom, and having a screen of 0.010 inch slots. The pipe 60 is surrounded at its upper end by a cement collar or bentonite seal 62, extending to the ground surface 64. Any suitable valve 68 can be provided in association with the air inlet to open or close the air inlet as desired. Surrounding a medial portion 70 of the pipe 60 within the borehole 58 is a bentonite slurry 72, which provides a gas-tight seal between the pipe 60 and the borehole 58. The slotted lower portion 74 of the pipe 60 is surrounded by gas-permeable packed sand 76. As will now be apparent, the pipe 60 facilitates the injection of air into either the zone surrounding the plume 14 (shown in FIG. 1) or into a preferential flow path (shown in FIG. 2) (preferential flow path 22 shown in FIG. 11).

Illustrated schematically in FIGS. 12 and 13 (not drawn to scale) is one specific embodiment of the present invention in which a packing 61 having an inflatable bladder is employed. More specifically, packing 61 is permanently attached to vacuum extraction pipe 30 by, for example, a threaded fitting. Optional gas inlet 41 and optional air inlet 31 pass through packing 61 to enable delivery of gas to the bottom opening of vacuum extraction pipe 30 and the bottom isolated section of riser pipe 44, respectively. Optional vacuum probes 63 enable measurement of the vacuum within the isolated zones defined by seals 54d and 56d, 54e and 56e, and 54f and 56f as well as measurement of the formation vacuum inside the well below packing 61. Inflation line 65 is connected to a gas source (not shown), such as an air compressor or the like, and enables introduction of a gas into the bladder area between membrane 67 and vacuum extraction pipe 30 to inflate the bladder and form a seal between vacuum extraction pipe 30 and riser pipe 44. If desired, inflation line 65 can be merely opened to atmospheric air so that atmospheric air is drawn into the bladder area upon activation of a vacuum within the riser pipe below packing 61.

Illustrated schematically in FIGS. 14 and 15 (not drawn to scale) is another embodiment of the present invention wherein another specific packing is employed. The packing has a framework 370 which supports first flexible member 381 to provide a seal between packing 61 and riser pipe 44 and between packing 61 and extraction tube 30. Framework 370 is lowered into the well with first member 381 in the deflated state. Frame 370 has end collars 372 and 374, which are spaced apart by spacers 376. These spacers 376 prevent the end collars 372 and 374 from moving toward each other when flexible members 381 and 383 are inflated with, for example, inflation lines 384 and 386. The device may be lowered by a cable arrangement 390 or any other known mechanical moving device. When packing 61 is at the desired level, the flexible members 381 and 383 are then actuated.

Packing 61 has a first flexible member 381 for creating a seal against riser pipe 44 and a second flexible member 383 for creating a seal with extraction tube 30. The flexible sealing members 381 and 383 are actuated when the packing is in the desired location within the well to provide a vertical segregation.

Turning now to FIG. 16 (not drawn to scale), another embodiment is illustrated in which the flexible members 380 and 383 are generally inflatable bladders having a generally circular tube type shape, similar to that of a doughnut. The flexible members 380 and 383 are concentric with the smaller, inner member 380 adapted to provide a seal between extraction tube 30 and the frame or the outer member 382. The larger, outer member 382 provides a seal between riser pipe 44 and the frame or the inner flexible member 380. It is possible to have tubes 31, 63 and other conduit pass between the flexible members 380 and 382 to allow working fluids to pass through the seal provided by the packing.

Specific embodiments of the invention will now be described in detail. These examples are intended to be illustrative, and the invention is not limited to the materials, conditions, or process parameters set forth in these embodiments.

EXAMPLE I

A vacuum extraction system was established comprising four wells and a vacuum pump. The wells comprised boreholes containing perforated riser pipes each four inches in diameter and 19.5 feet in depth, inside of which were situated vacuum extraction pipes 1 inch in diameter connected to the vacuum pump (obtained from Trivini Pumps USA, Michigan City, Ind.). The riser pipes were of stainless steel and were equipped with 0.010 inch slots in the perforated portions. The water table was at a depth of about 15 feet from the surface and the perforations in the riser pipes extended from a depth of 12 feet beneath the surface to 21 feet beneath the surface. One of the four wells exhibited significant venting or "short circuiting" believed to be caused by sub grade utilities. The well head (measured at the top of the vacuum extraction pipe, to measure the vacuum delivered to the top of the well) for the venting well was measured at 21 inches of mercury and the formation vacuum pressurization (measured inside the well itself) was measured at 0 inches of mercury. A packing as illustrated in FIGS. 12 and 13 was situated in the venting well at a depth of six feet below the surface and inflated to seal the space between the riser pipe and the vacuum extraction pipe from vacuum applied from the vacuum extraction pipe. The packing was of stainless steel with rubber membranes and measured 26 inches in length and 3 inches in diameter (before inflation). Subsequent to actuation of the packing, the well head for the venting well was measured at 23 inches of mercury and the formation vacuum was measured at 2 inches of mercury.

EXAMPLE II

A vacuum extraction system was established comprising six wells and a vacuum pump. The wells comprised boreholes containing perforated riser pipes each four inches in diameter, inside of which were situated vacuum extraction pipes 1.5 inches in diameter connected to the vacuum pump (obtained from Trivini Pumps USA, Michigan City, Ind.). The riser pipes were of stainless steel and were equipped with 0.010 inch slots in the perforated portions. The water table was at a depth of about 8 feet from the surface. Well 1 was situated within bedrock and the riser pipe extended to a depth of 29.7 feet, with perforations extending from a depth of 4.1 feet beneath the surface to 29.1 feet beneath the surface. Well 2 was situated within low permeability soil above the bedrock and the riser pipe extended to a depth of 12.1 feet, with perforations extending from a depth of 4.3 feet beneath the surface to 12.1 feet beneath the surface. Well 3 was situated in low permeability soil and the riser pipe extended to a depth of 12 feet, with perforations extending from a depth of 3.9 feet beneath the surface to 11.7 feet beneath the surface.

Wells 1 and 2 were initially operated simultaneously with no packings. Well 3 exhibited significant venting and could not be operated without a packing in place. The system vapor flow from wells 1 and 2 operated simultaneously initially was 139 standard cubic feet per minute (SCFM) and mass removal was 0.59 pounds per hour. Thereafter, packings as described in Example I were placed in well 1 at a depth of 12.0 feet below the surface and in well 2 at a depth of 10.0 feet below the surface and actuated simultaneously. The system vapor flow from wells 1 and 2 subsequently dropped to 121 SCFM and mass removal increased to 1.1 pounds per hour. Thereafter, a packing as described in Example I was placed in well 3 at a depth of 8.5 feet below the surface and actuated, and the system vapor flow from wells 1, 2, and 3 operating simultaneously was 148 SCFM and the mass removal was 2.24 pounds per hour.

EXAMPLE III

A vacuum extraction system was established comprising three wells and a vacuum pump. The wells comprised boreholes containing perforated riser pipes each four inches in diameter, inside of which were situated vacuum extraction pipes 1.5 inches in diameter connected to the vacuum pump (Nash Pump Model SC6, obtained from Nash Equipment Co., Middlesex, N.J.). The riser pipes were of polyvinyl chloride and were equipped with 0.010 inch slots in the perforated portions. The water table was at a depth of about 4 feet from the surface. Well 1 was situated in soil above bedrock and the riser pipe extended to a depth of 12 feet, with perforations extending from a depth of 8 feet beneath the surface to 12 feet beneath the surface.

Well 1 was initially operated with no packing. The system vapor flow from well 1 initially was 172 SCFM and mass removal was 0.29 pounds per hour. The system operating vacuum was measured at 20.5 inches of mercury. Thereafter, a packing as described in Example I was placed in well 1 at a depth of 6.5 feet below the surface and actuated. The system vapor flow from well 1 subsequently dropped to 113 SCFM and mass removal increased to 0.31 pounds per hour. Subsequent to actuation of the packing, the system operating vacuum (measuring the vacuum that the system is producing at any given time, and measured at the vacuum pump) was measured at 23.1 inches of mercury.

Other embodiments and modifications of the present invention may occur to those skilled in the art subsequent to a review of the information presented herein; these embodiments and modifications, as well as equivalents thereof, are also included within the scope of this invention.

What is claimed is:

1. A process for removing contaminants from a contaminated area of the subsurface which comprises:
    a) providing a borehole in the contaminated area;
    b) placing in the borehole a perforated riser pipe inside of which is situated a vacuum extraction pipe with an opening situated within the perforated riser pipe, wherein an actuatable flexible membrane packing is situated in a portion of the annular space between the vacuum extraction pipe and the perforated riser pipe;
    c) applying a vacuum to the vacuum extraction pipe to draw gases and liquid from the subsurface into the perforated riser pipe below the actuatable flexible membrane packing and from the riser pipe into the vacuum extraction pipe and transport both the gases and the liquid to the surface as a common stream, said drawn gases primarily including those residing in the contaminated area prior to application of said vacuum;
    d) forming from the common stream a stream which is primarily liquid and a stream which is primarily gaseous; and
    e) removing contaminants from at least one of the liquid stream and the gaseous stream.

2. A process according to claim 1 wherein the subsurface has a vadose zone and a water table, the borehole extends to a depth below the water table and the perforations of the riser pipe are situated only below the water table.

3. A process according to claim 1 wherein the subsurface has a vadose zone and a water table, the borehole extends to a depth below the water table and the perforations of the riser pipe are situated both in the vadose zone and below the water table.

4. A process according to claim 1 wherein the subsurface has a vadose zone and a water table and the perforations of the riser pipe are situated only in the vadose zone above the water table.

5. A process according to claim 1 wherein the contaminated area of the subsurface comprises soil having a first permeability, said subsurface having a plurality of paths of preferential flow, each path having a permeability greater than the first permeability, wherein the borehole intersects at least a first path of preferential flow and a second path of preferential flow, said second path of preferential flow being situated at a depth greater than said first path of preferential flow, wherein the first path of preferential flow is isolated from the second path of preferential flow so that a vacuum applied within the second path of preferential flow will extract gases and liquids from the second path of preferential flow but not from the first path of preferential flow when the packing is situated at a depth between the first path of preferential flow and the second path of preferential flow.

6. A process according to claim 1 wherein the packing is positionally variable in depth within the riser pipe.

7. A process according to claim 1 wherein the actuatable flexible membrane packing expands and contracts to form and break a seal between the vacuum extraction pipe and the riser pipe.

8. A process according to claim 7 wherein the actuatable flexible membrane packing is actuated by inflation of a membrane with a fluid.

9. A process according to claim 8 wherein the fluid is a gas.

10. A process according to claim 1 wherein at least one seal is situated around the perforated riser pipe in the borehole, so that a vacuum applied within the riser pipe at a depth below the seal will extract gases and liquids from the subsurface forming the borehole below the seal but not from the subsurface forming the borehole above the seal when the packing is situated at a depth at or below the seal.

11. A process according to claim 1 wherein the packing is adjusted in depth within the riser pipe and vacuum is applied to the vacuum extraction pipe both before adjustment of the depth of the packing and after adjustment of the depth of the packing.

12. A process for removing contaminants from a contaminated area of the subsurface which comprises:
    a) providing a borehole in the contaminated area;
    b) placing in the borehole a perforated riser pipe inside of which is situated a vacuum extraction pipe with an opening situated within the perforated riser pipe, wherein an actuatable flexible membrane packing is situated in a portion of the annular space between the vacuum extraction pipe and the perforated riser pipe;
    c) applying a vacuum to the vacuum extraction pipe to draw gases and liquid from the subsurface into the perforated riser pipe below the actuatable flexible membrane packing and from the riser pipe into the vacuum extraction pipe and transport both the gases and the liquid to the surface as a common stream;

d) introducing a gas into the riser pipe below the packing while a vacuum is applied to the vacuum extraction pipe;

d) forming from the common stream a stream which is primarily liquid and a stream which is primarily gaseous; and e) removing contaminants from at least one of the liquid stream and the gaseous stream.

13. An apparatus for removing contaminants from a contaminated area of the subsurface which comprises:

a) a perforated riser pipe extending downwardly from the surface;

b) a vacuum extraction pipe situated inside of the riser pipe and having an opening situated within the perforated riser pipe;

c) an actuatable flexible membrane packing situated in a portion of the annular space between the vacuum extraction pipe and the perforated riser pipe;

d) a vacuum-forming apparatus in fluid communication with the vacuum extraction pipe and adapted to form a zone of reduced pressure in the subsurface around the riser pipe below the actuatable flexible membrane packing, whereby gases and liquid can be drawn from the subsurface into the riser pipe below the flexible packing and from the riser pipe into the vacuum extraction pipe and conveyed to the surface as a common stream, said drawn gases primarily including those residing in the contaminated area prior to application of said vacuum;

e) a vapor-liquid separator in fluid communication with the vacuum-forming apparatus and the vacuum extraction pipe, wherein the vapor-liquid separator separates the common stream into separate gas and liquid streams; and f) a contaminant removal system, said contaminant removal system being situated to remove contaminants from at least one of the liquid stream and the gas stream.

14. An apparatus according to claim 13 wherein the subsurface has a vadose zone and a water table, the borehole extends to a depth below the water table and the perforations of the riser pipe are situated only below the water table.

15. An apparatus according to claim 13 wherein the subsurface has a vadose zone and a water table, the borehole extends to a depth below the water table and the perforations of the riser pipe are situated both in the vadose zone and below the water table.

16. An apparatus according to claim 13 wherein the subsurface has a vadose zone and a water table and the perforations of the riser pipe are situated only in the vadose zone above the water table.

17. An apparatus according to claim 13 wherein the contaminated area of the subsurface comprises soil having a first permeability, said subsurface having a plurality of paths of preferential flow, each path having a permeability greater than the first permeability, wherein the borehole intersects at least a first path of preferential flow and a second path of preferential flow, said second path of preferential flow being situated at a depth greater than said first path of preferential flow, wherein the the first path of preferential flow is isolated from the second path of preferential flow so that a vacuum applied within the second path of preferential flow will extract gases and liquids from the second path of preferential flow but not from the first path of preferential flow when the packing is situated at a depth between the first path of preferential flow and the second path of preferential flow.

18. An apparatus according to claim 13 wherein the packing is positionally variable in depth within the riser pipe.

19. An apparatus according to claim 13 wherein the actuatable flexible membrane packing expands and contracts to form and break a seal between the vacuum extraction pipe and the riser pipe.

20. An apparatus according to claim 19 wherein the actuatable flexible membrane packing is actuated by inflation of a membrane with a fluid.

21. An apparatus according to claim 20 wherein the fluid is a gas.

22. An apparatus according to claim 13 wherein at least one seal is situated around the perforated riser pipe in the borehole, so that a vacuum applied within the riser pipe at a depth below the seal will extract gases and liquids from the subsurface forming the borehole below the seal but not from the subsurface forming the borehole above the seal when the packing is situated at a depth at or below the seal.

23. An apparatus for removing contaminants from a contaminated area of the subsurface which comprises:

a) a perforated riser pipe extending downwardly from the surface;

b) a vacuum extraction pipe situated inside of the riser pipe and having an opening situated within the perforated riser pipe;

c) an actuatable flexible membrane packing situated in a portion of the annular space between the vacuum extraction pipe and the perforated riser pipe;

d) a vacuum-forming apparatus in fluid communication with the vacuum extraction pipe and adapted to form a zone of reduced pressure in the subsurface around the riser pipe below the actuatable flexible membrane packing, whereby gases and liquid can be drawn from the subsurface into the riser pipe below the flexible packing and from the riser pipe into the vacuum extraction pipe and conveyed to the surface as a common stream;

e) a gas inlet enabling introduction of gas into the riser pipe below the packing;

f) a vapor-liquid separator in fluid communication with the vacuum-forming apparatus and the vacuum extraction pipe, wherein the vapor-liquid separator separates the common stream into separate gas and liquid streams; and g) a contaminant removal system, said contaminant removal system being situated to remove contaminants from at least one of the liquid stream and the gas stream.

* * * * *